Sept. 22, 1942. P. C. B. ALLEN ET AL 2,296,758
MACHINE FOR ASSEMBLING CARTON PARTITIONS
Filed Feb. 26, 1941 22 Sheets-Sheet 18

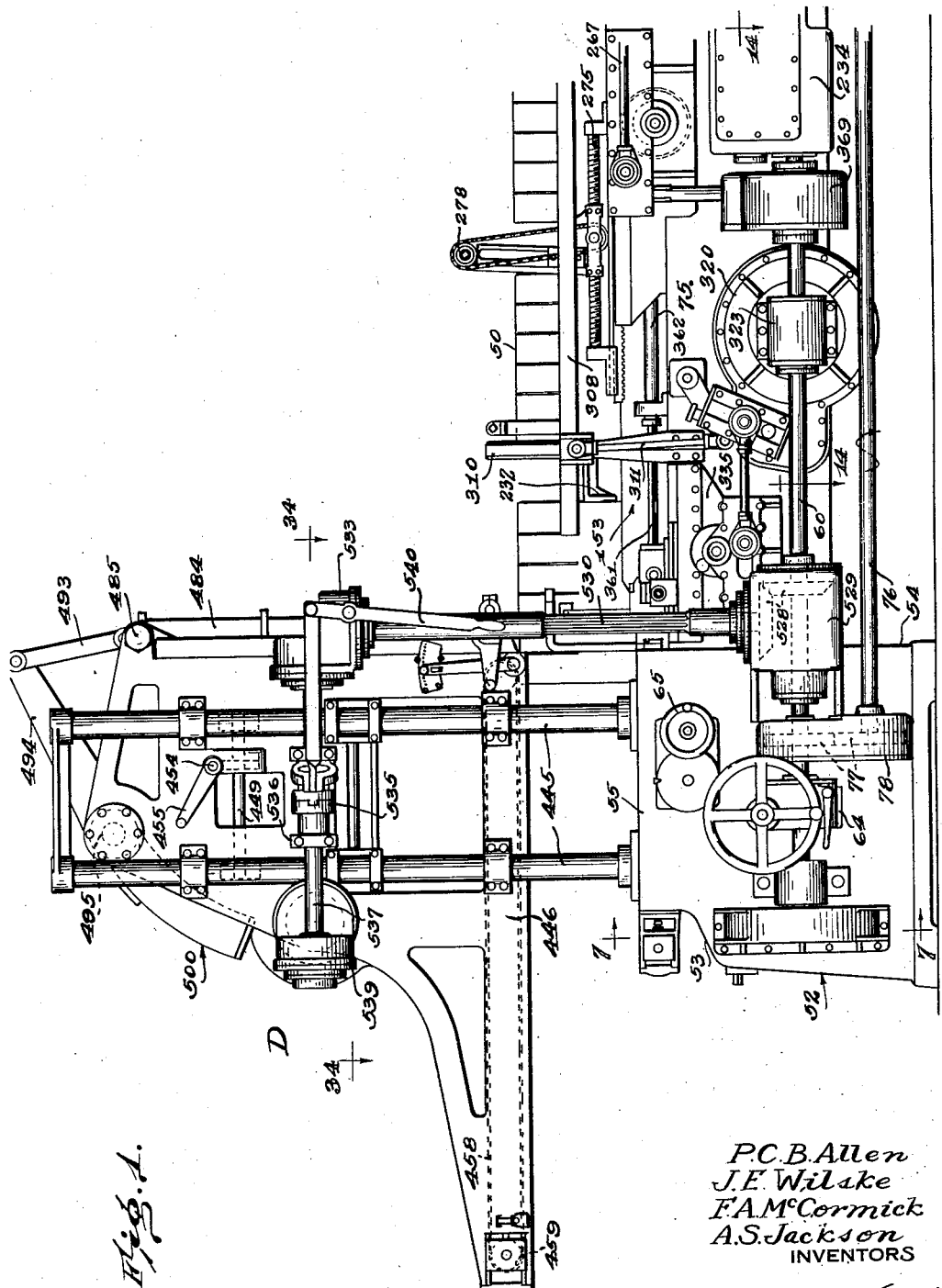

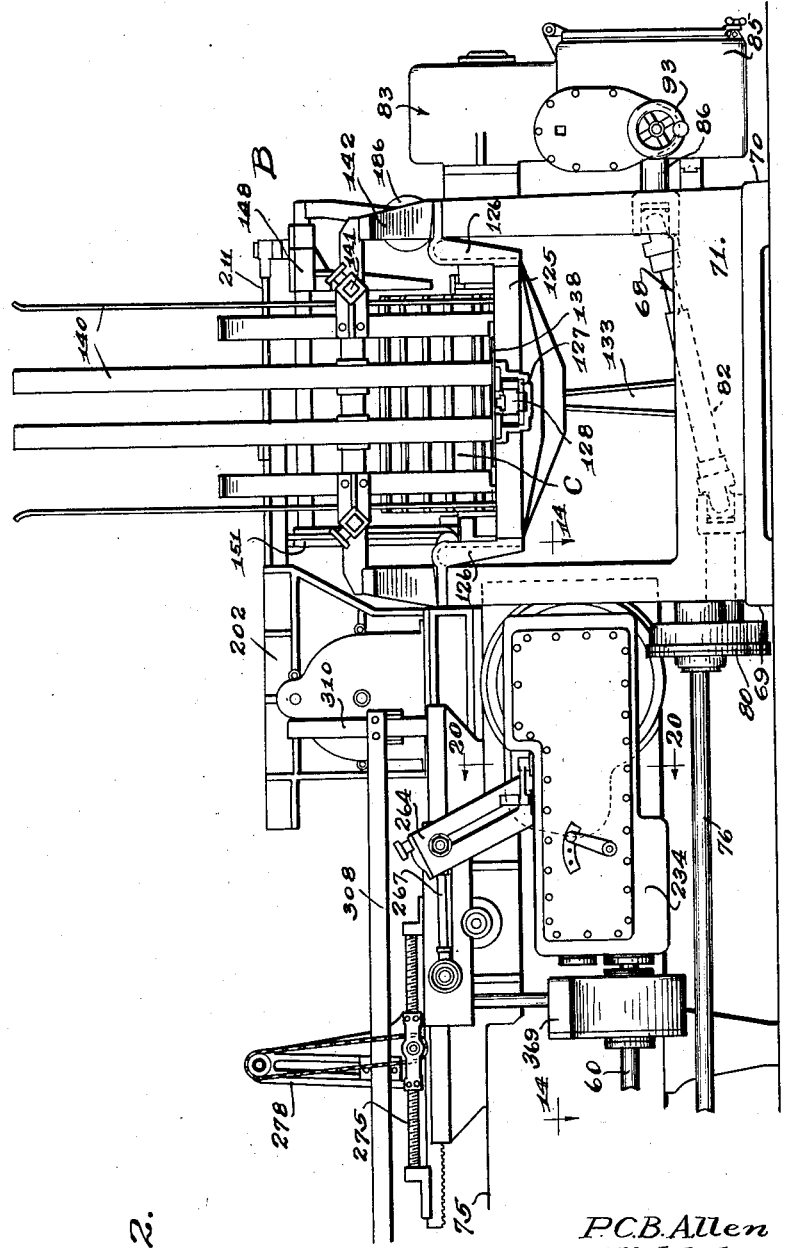

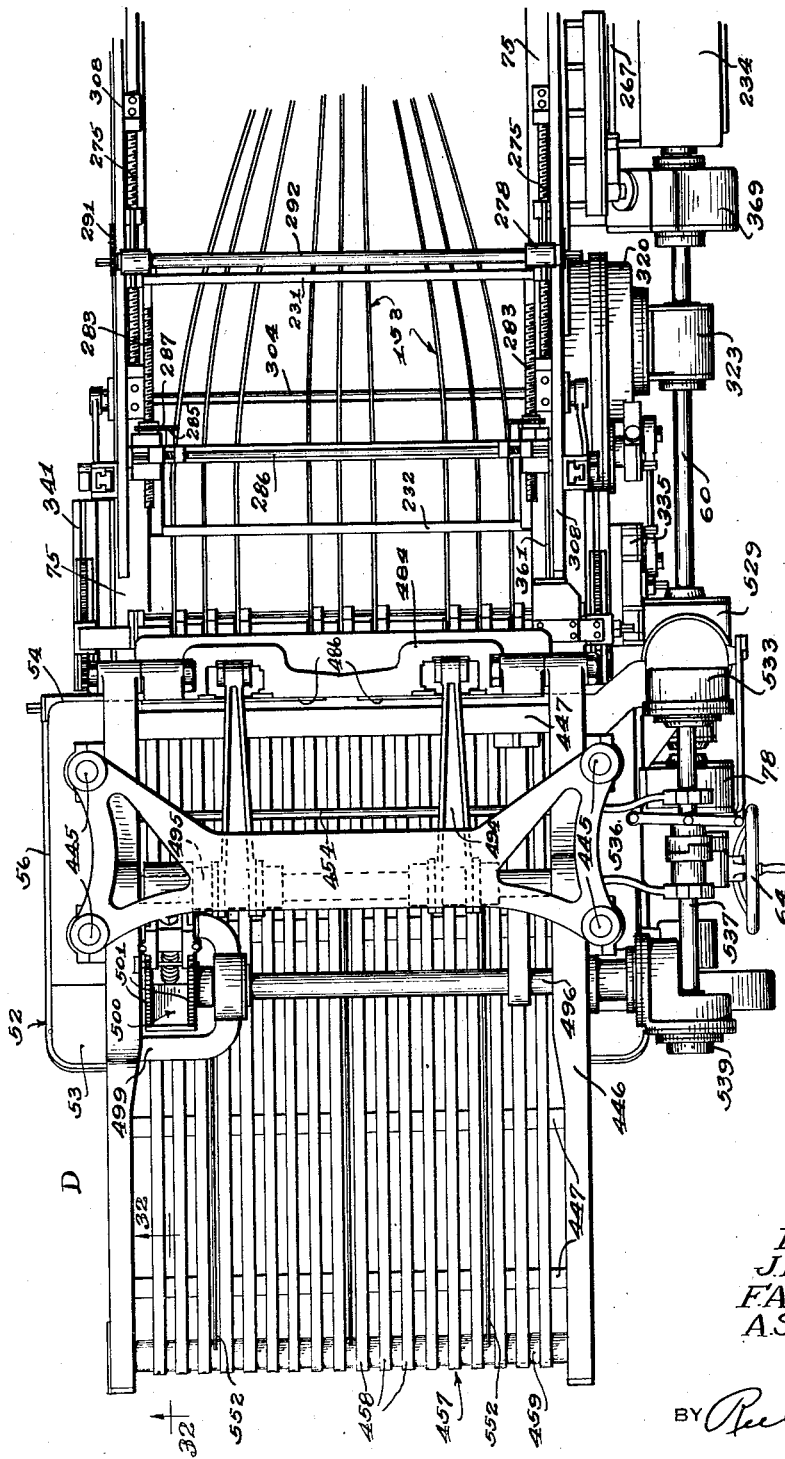

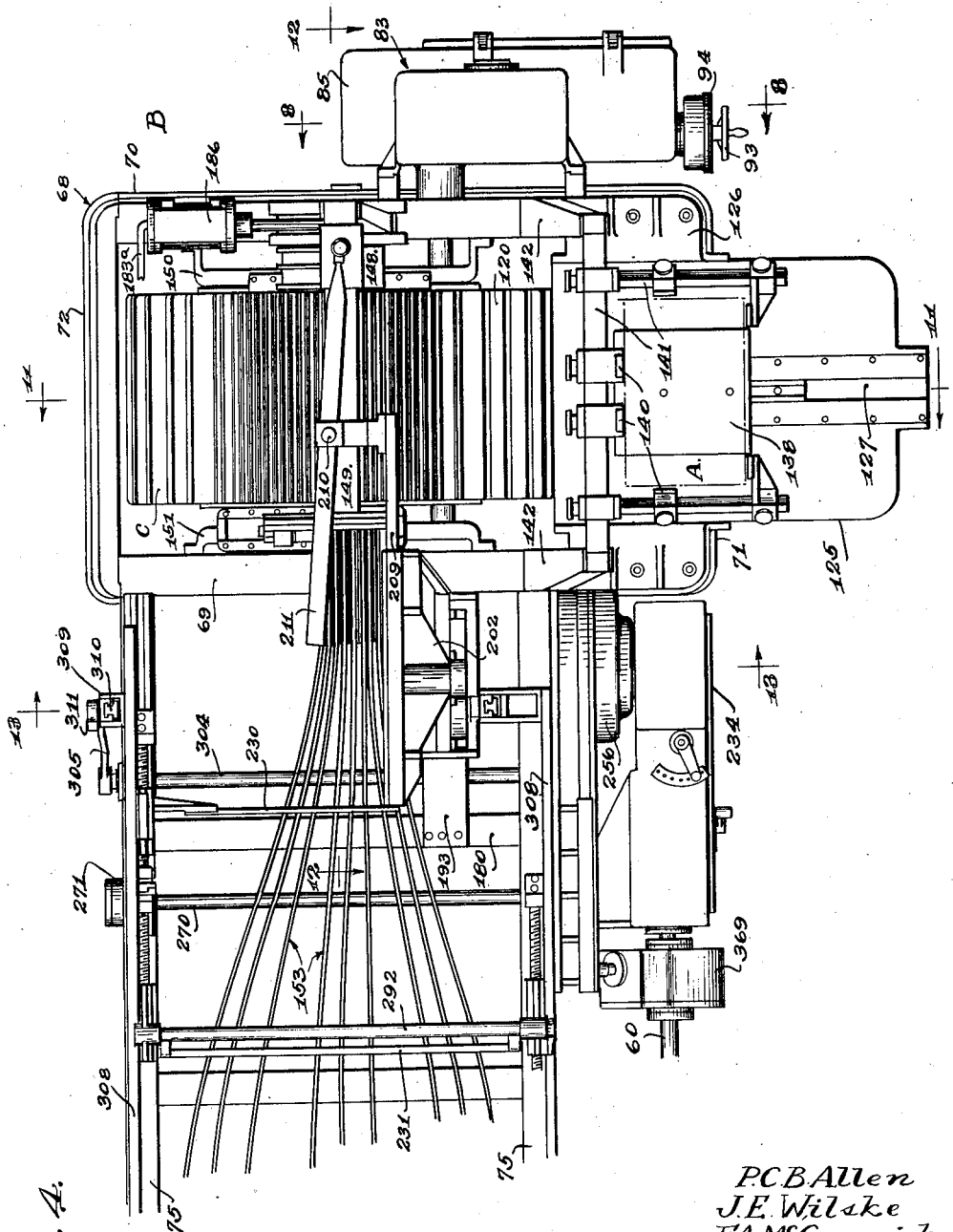

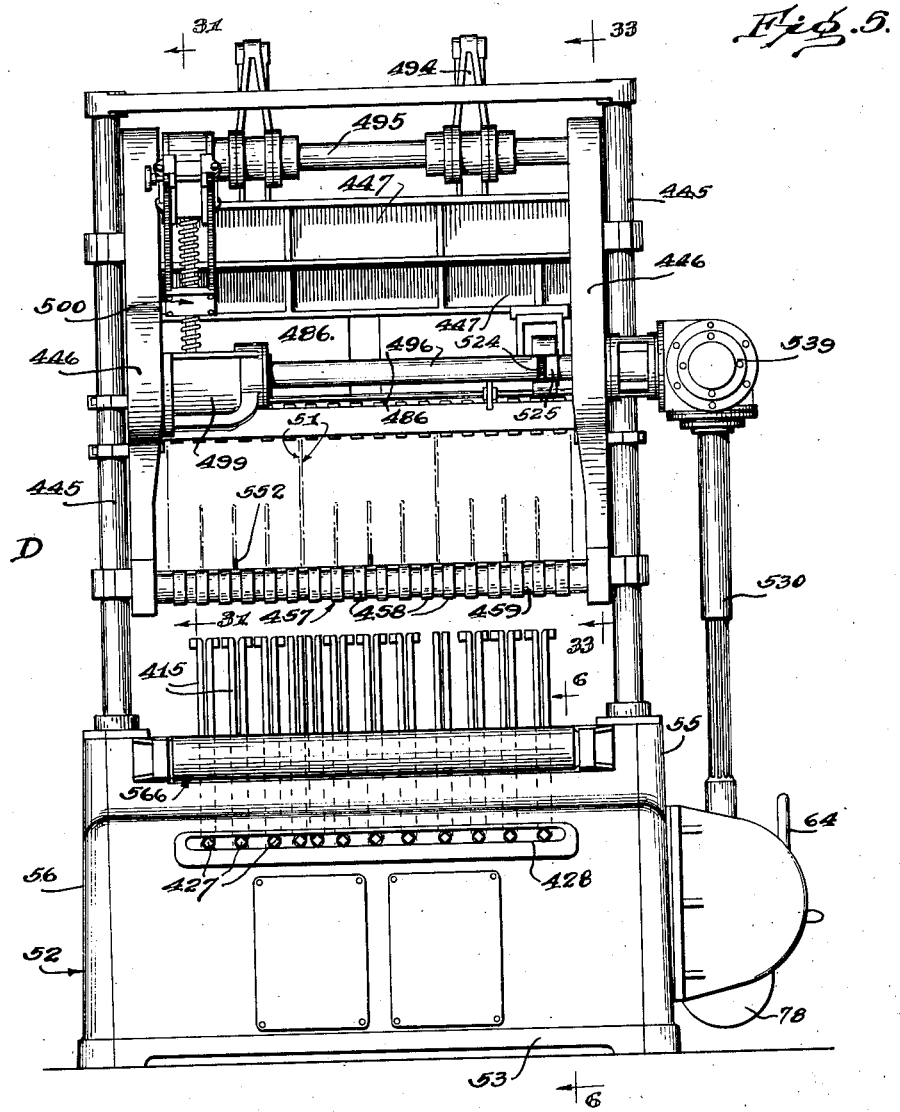

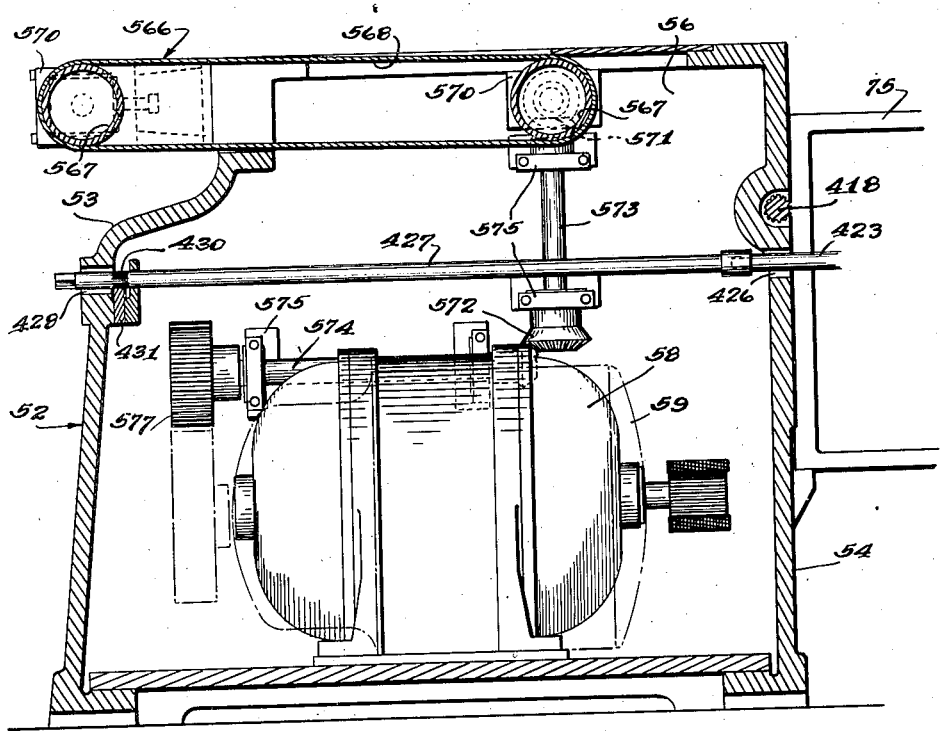
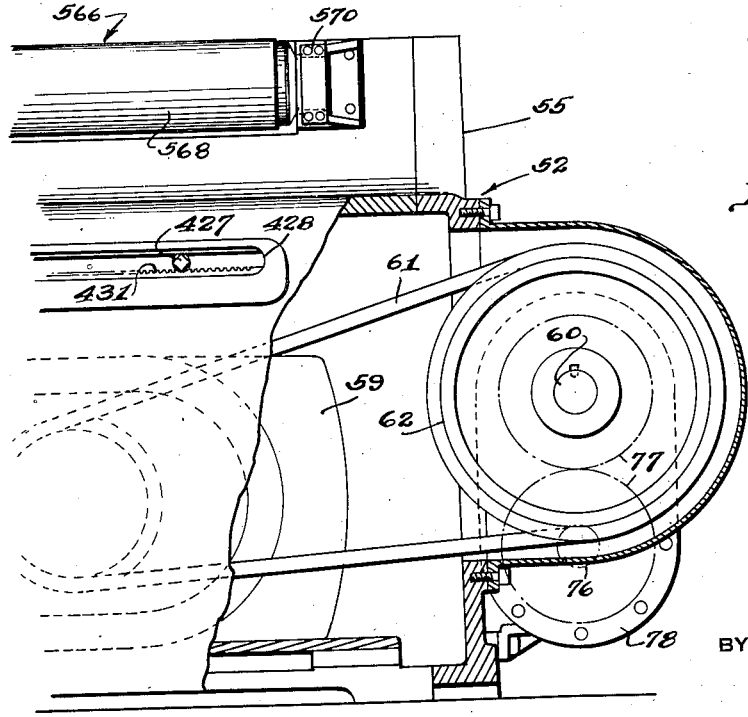

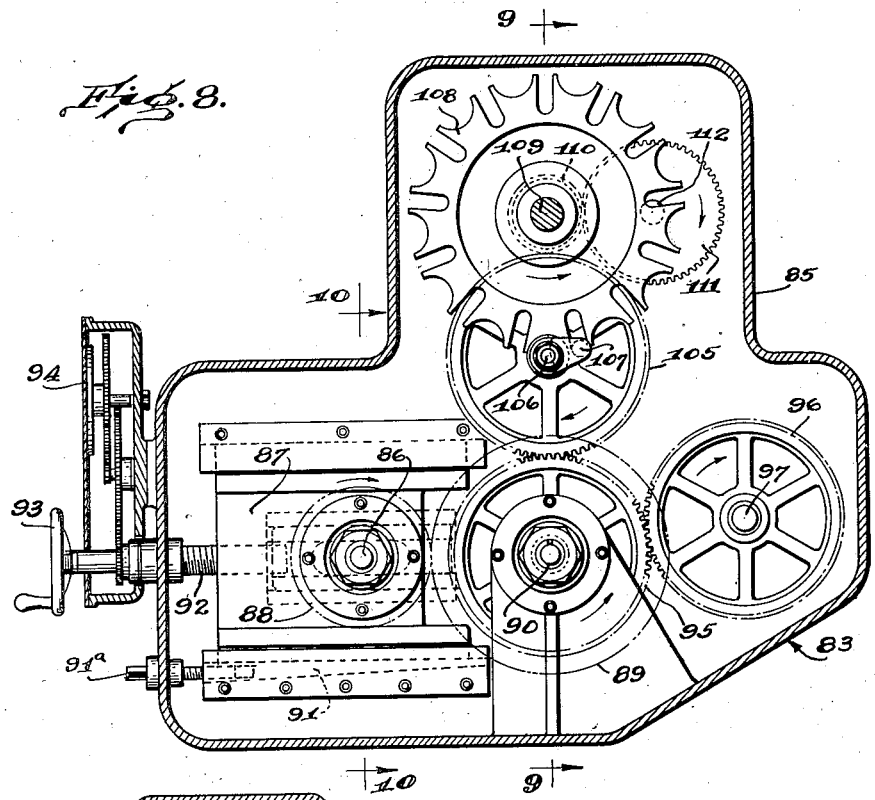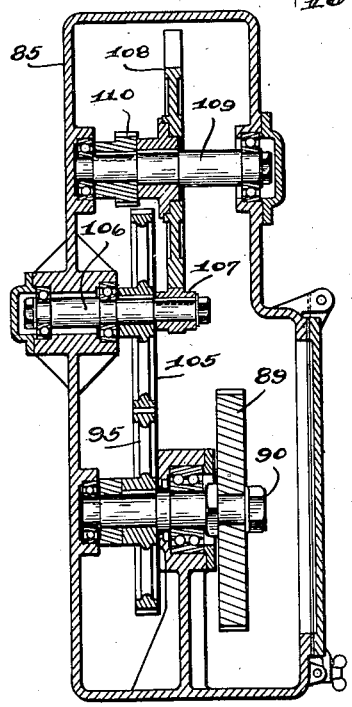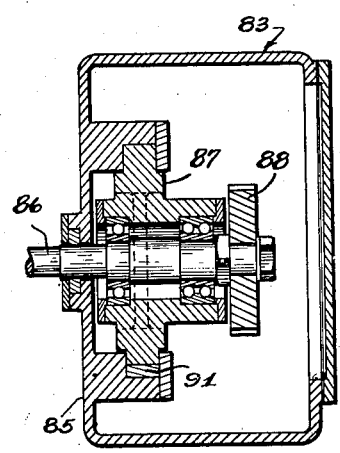

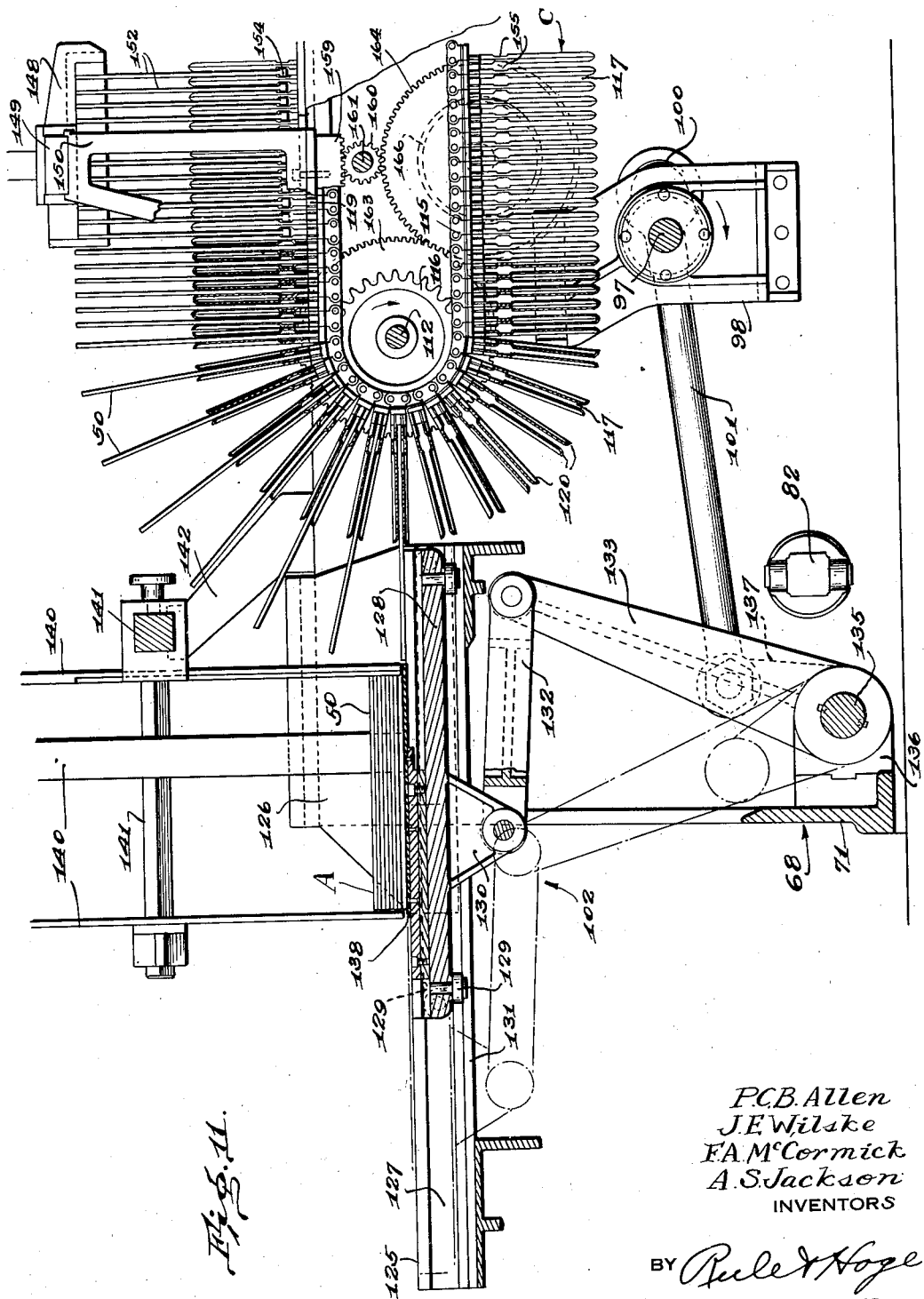

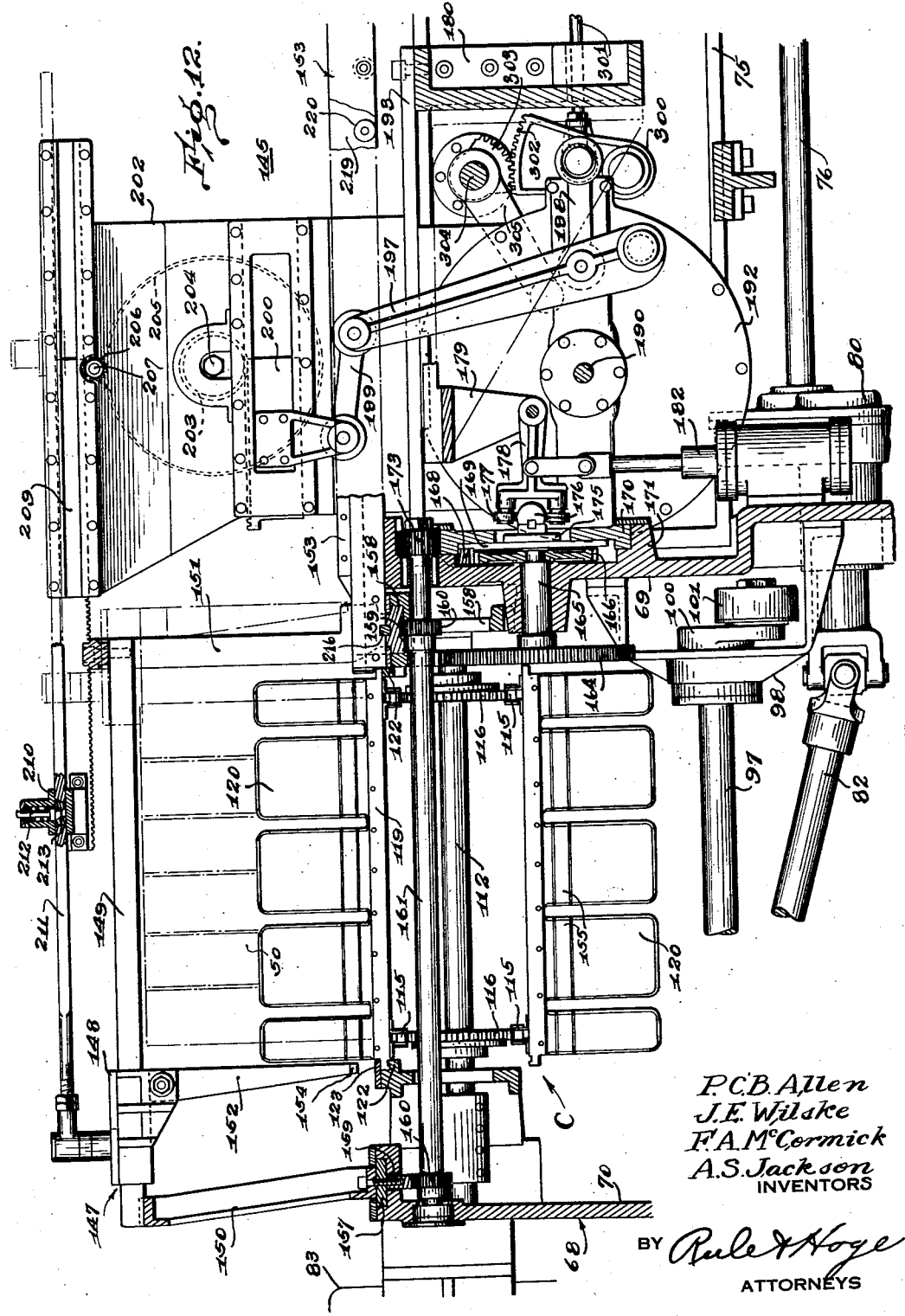

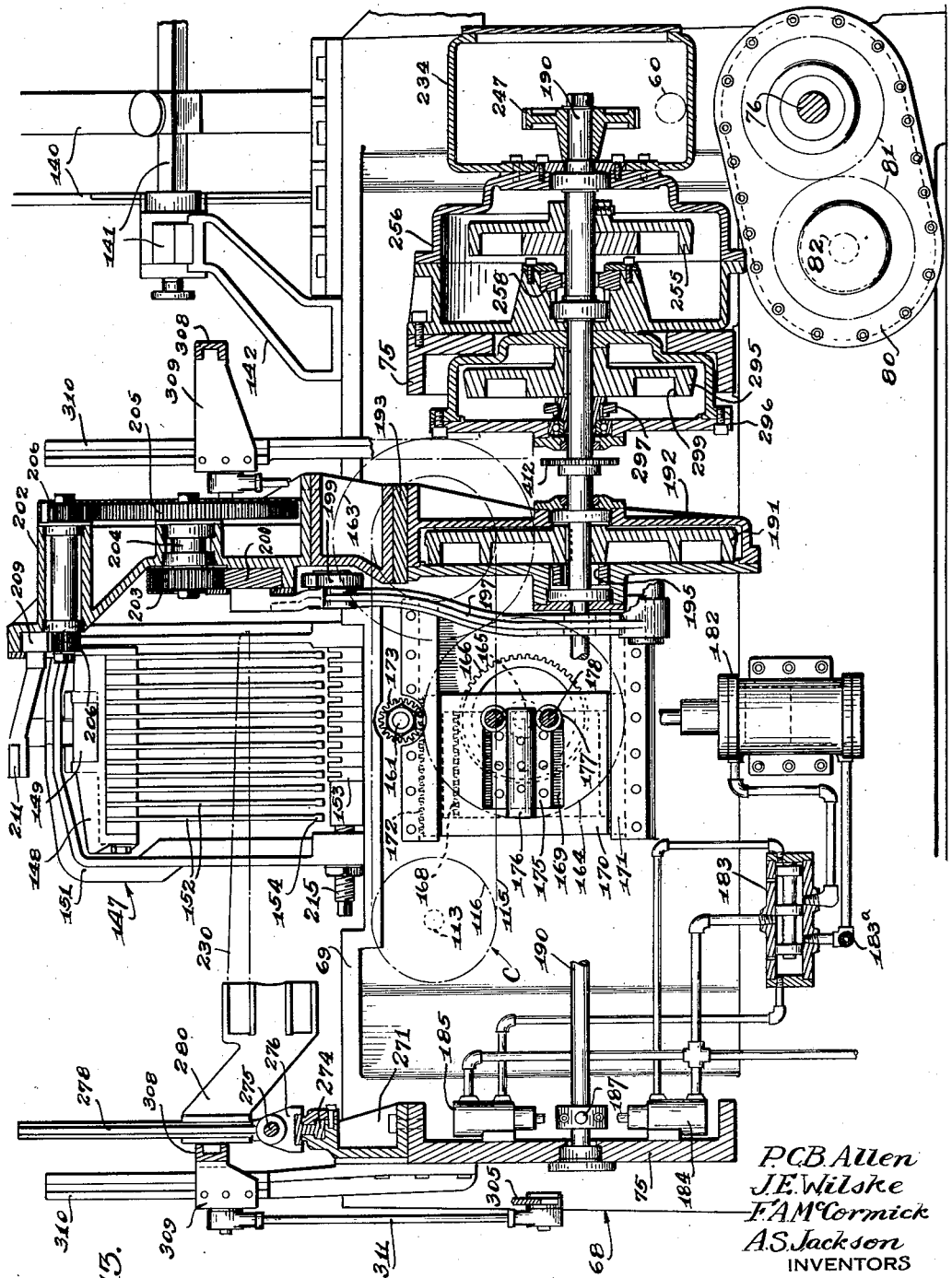

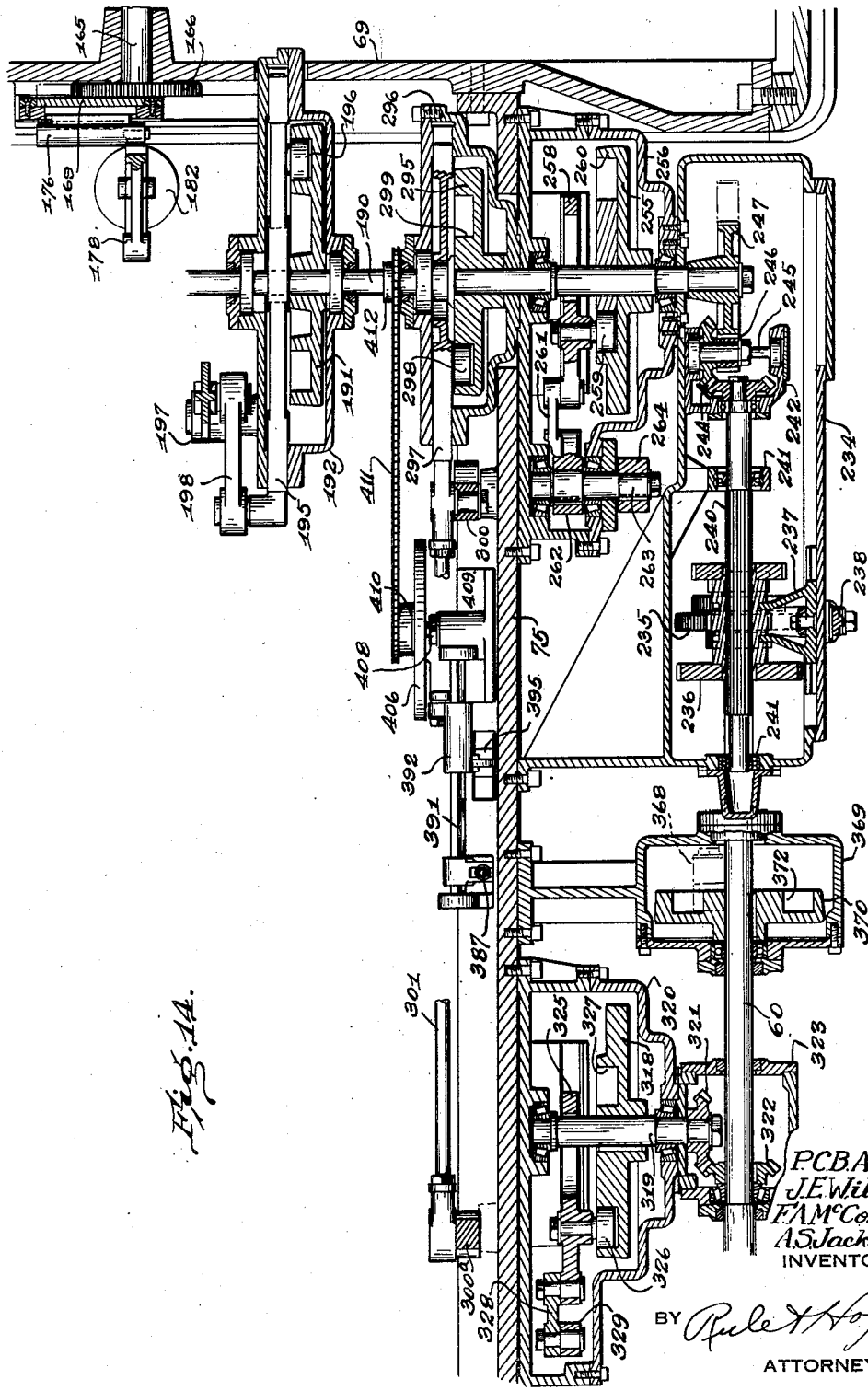

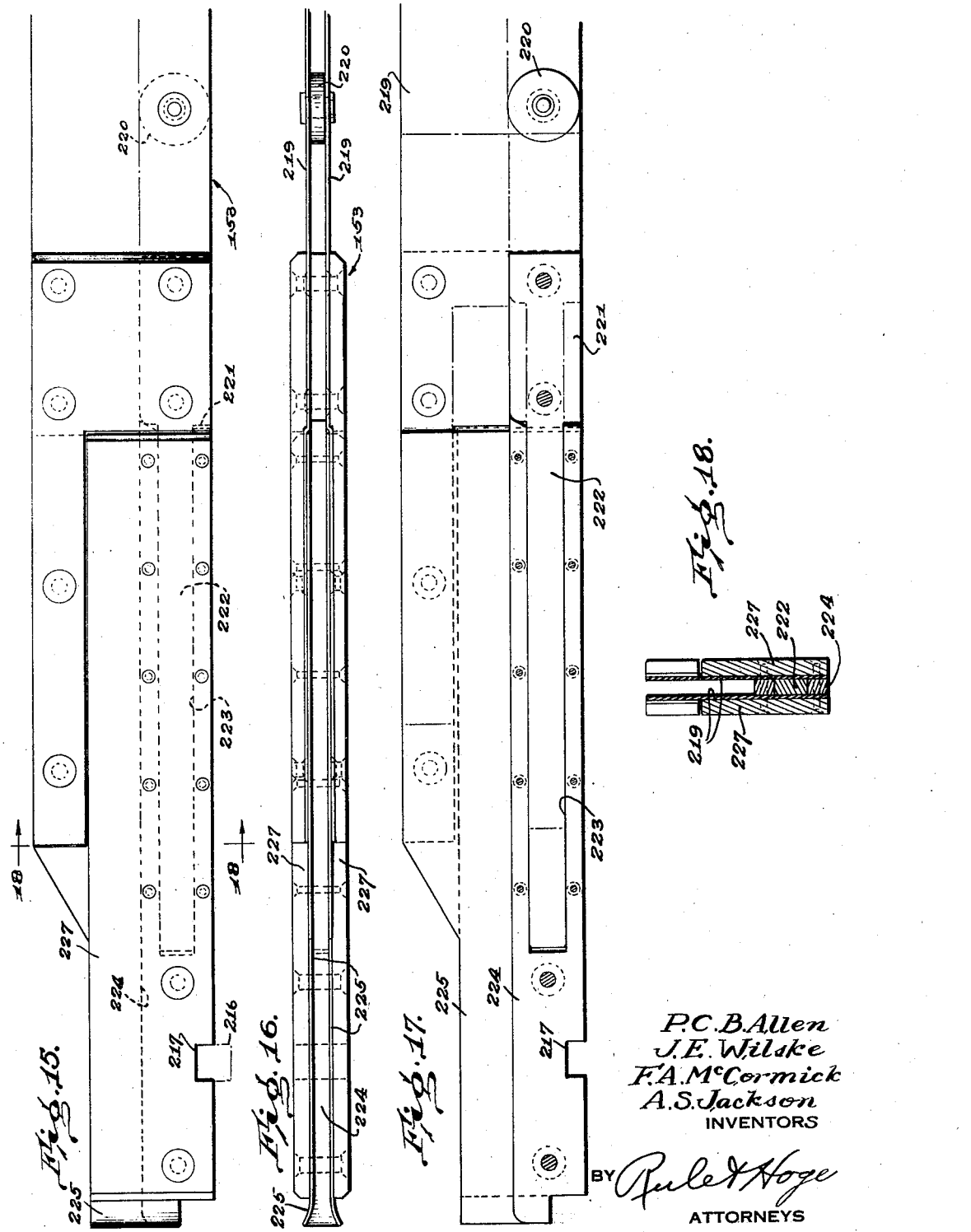

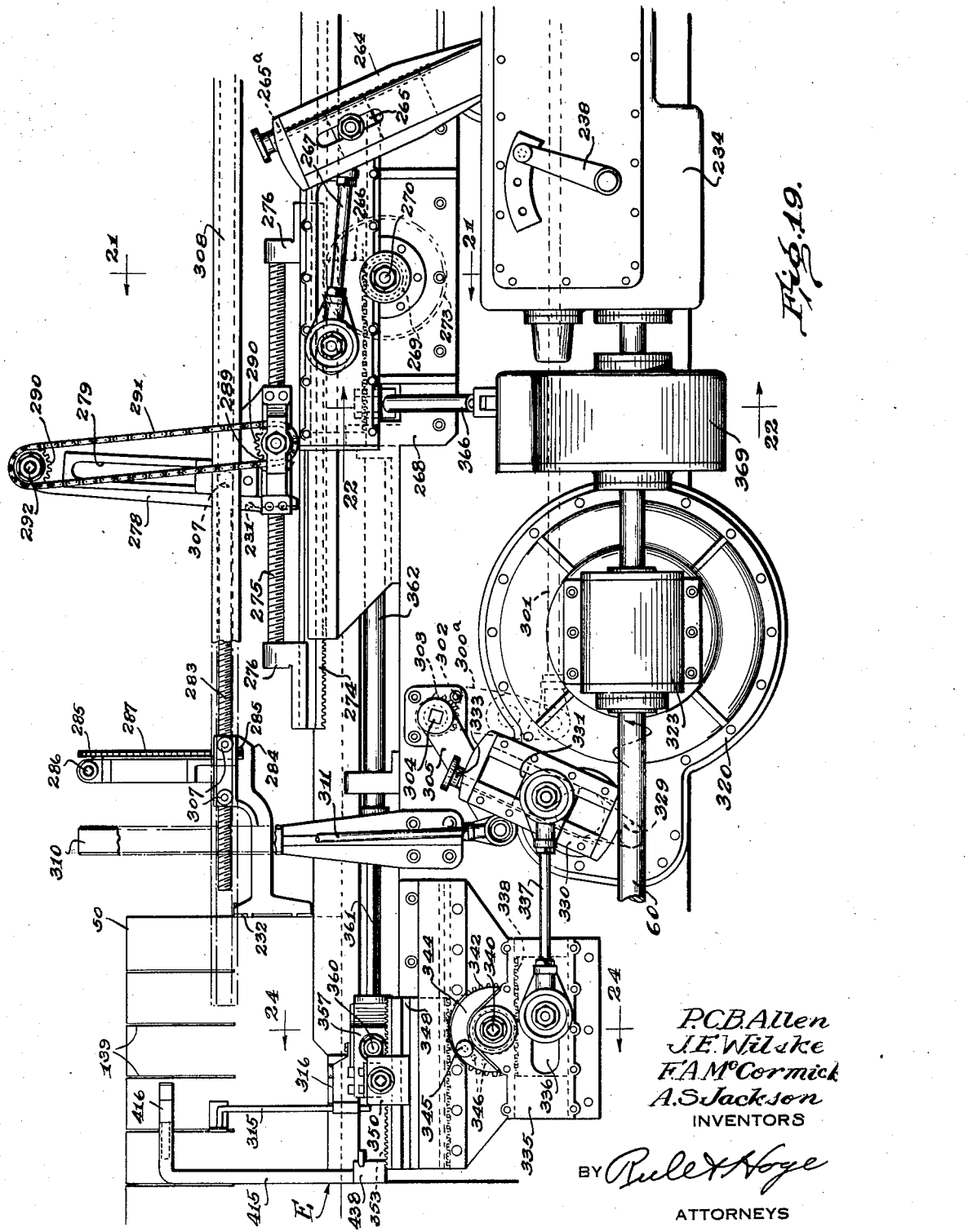

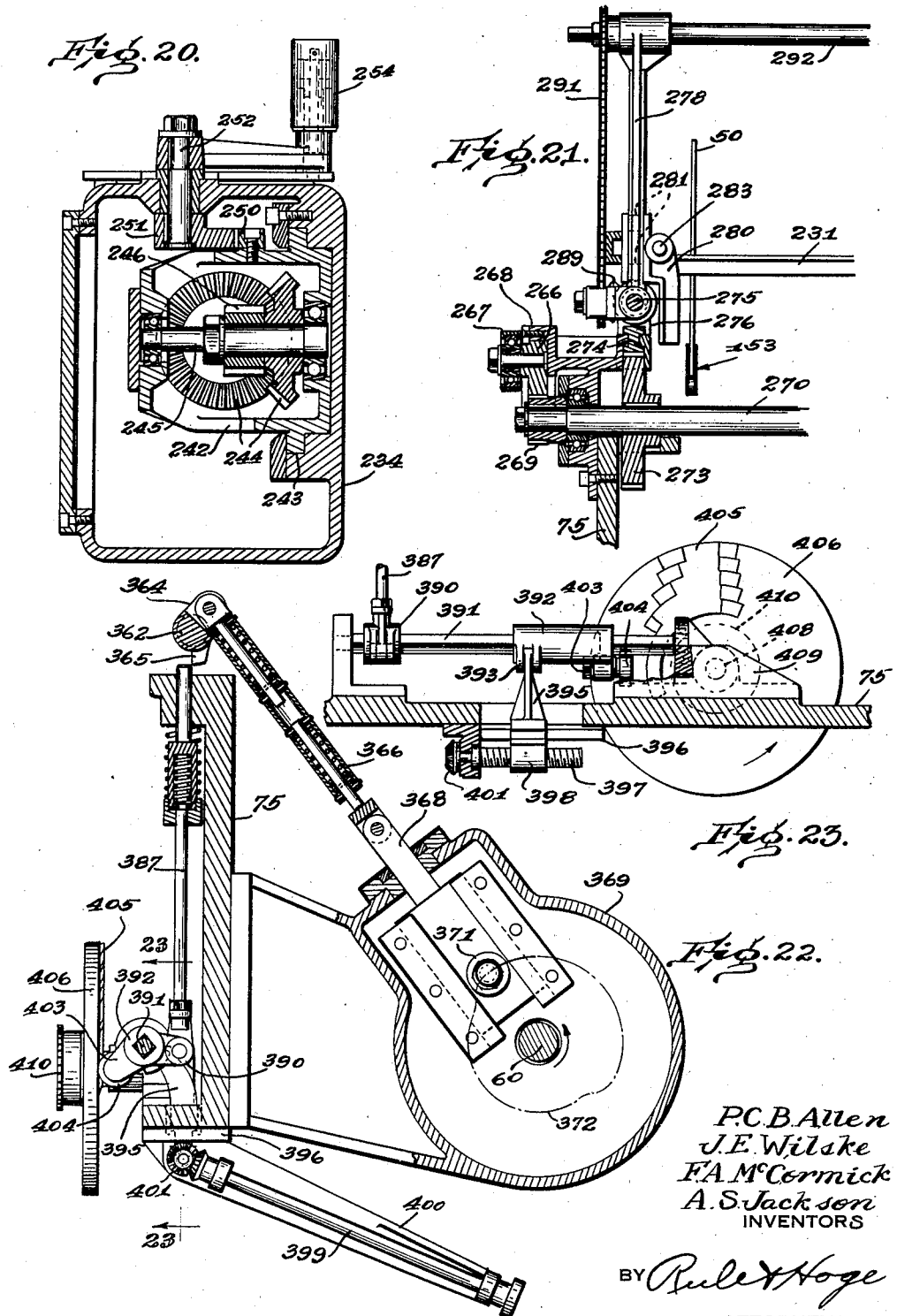

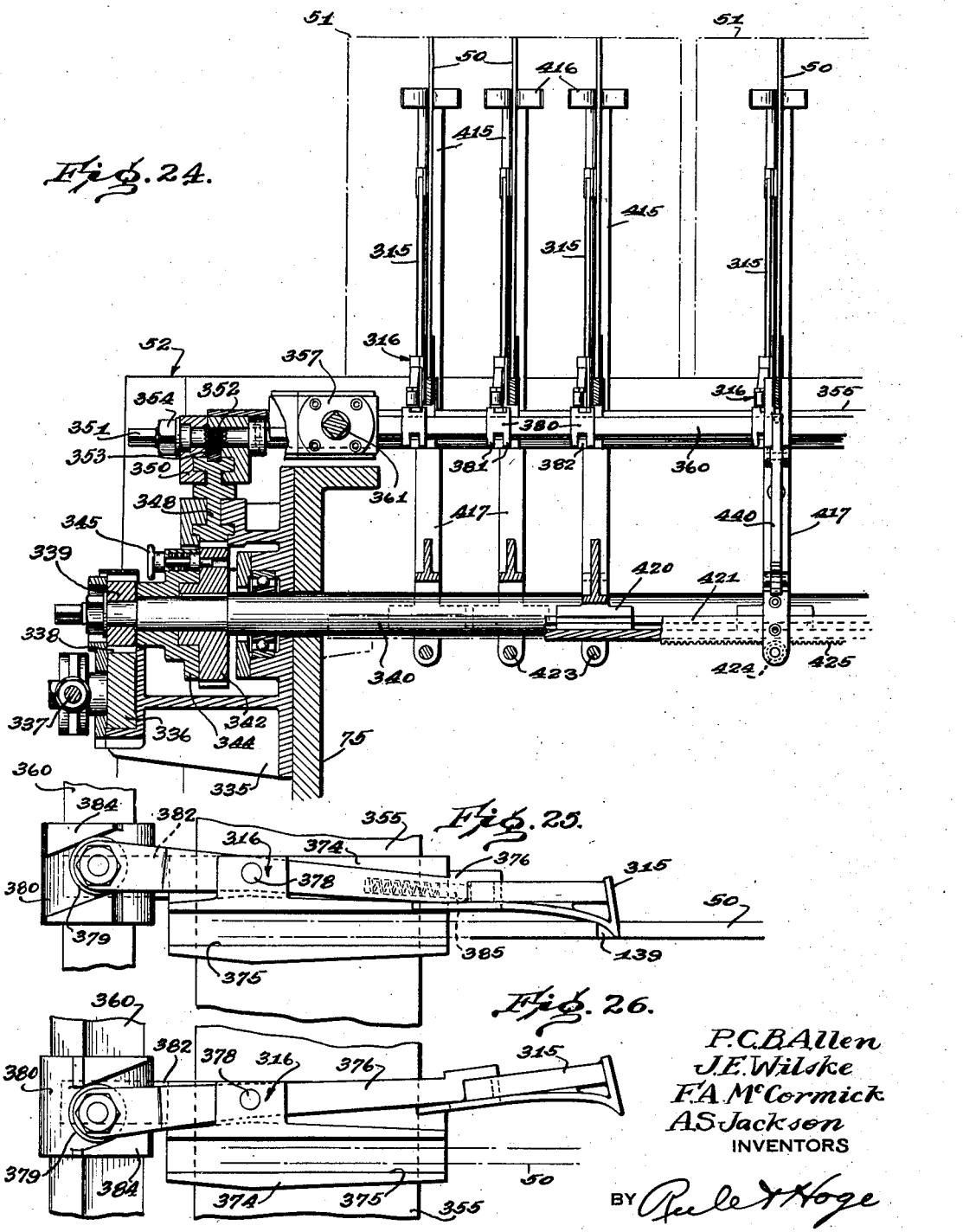

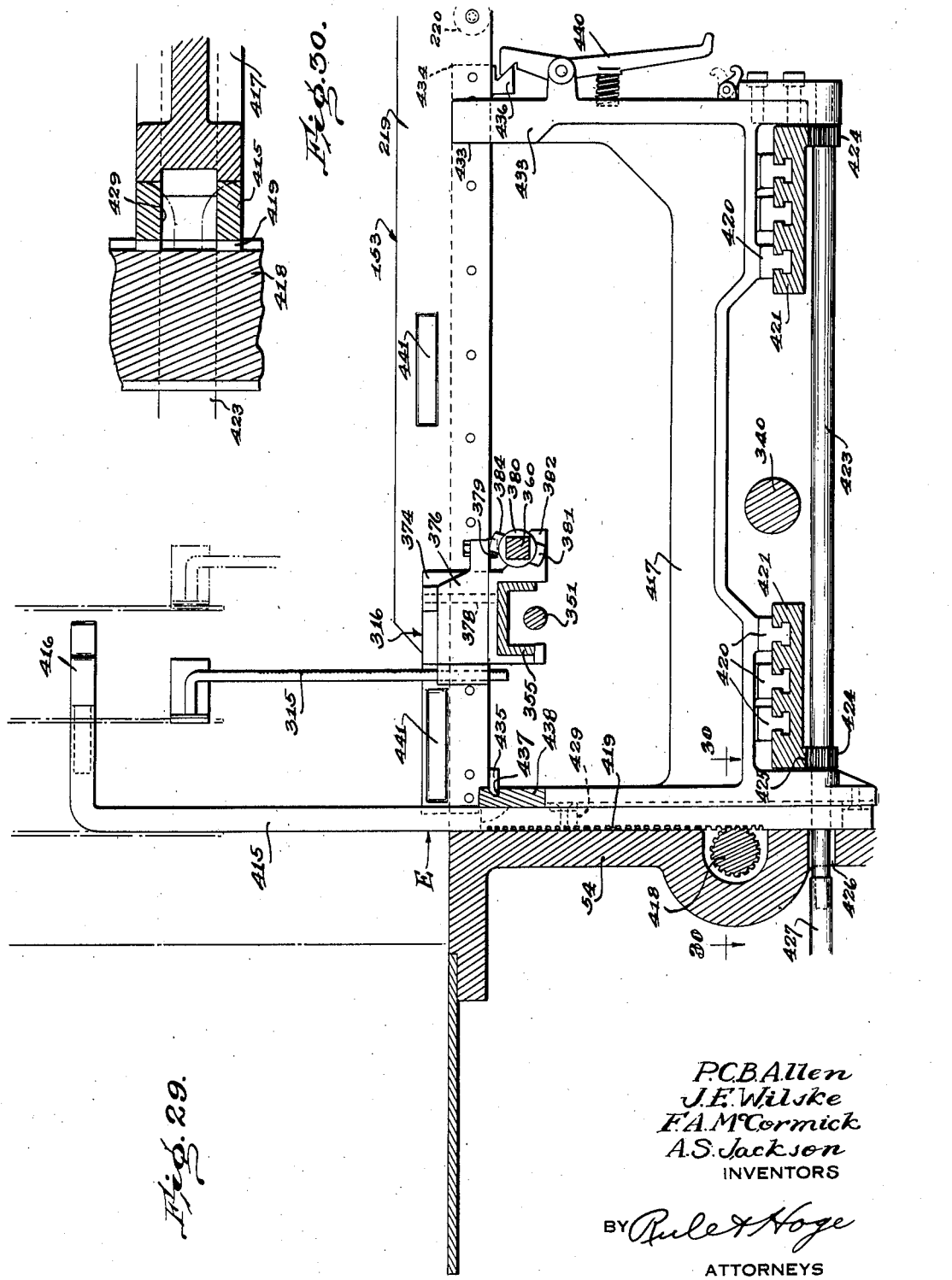

P.C.B. Allen
J.F. Wilake
F.A. McCormick
A.S. Jackson
INVENTORS

BY Rule & Hoge
ATTORNEYS

Sept. 22, 1942. P. C. B. ALLEN ET AL 2,296,758
MACHINE FOR ASSEMBLING CARTON PARTITIONS
Filed Feb. 26, 1941 22 Sheets-Sheet 20

P.C.B.Allen
J.E.Wilske
F.A.M?Cormick
A.S.Jackson
INVENTORS

BY *Rule & Hoge*
ATTORNEYS

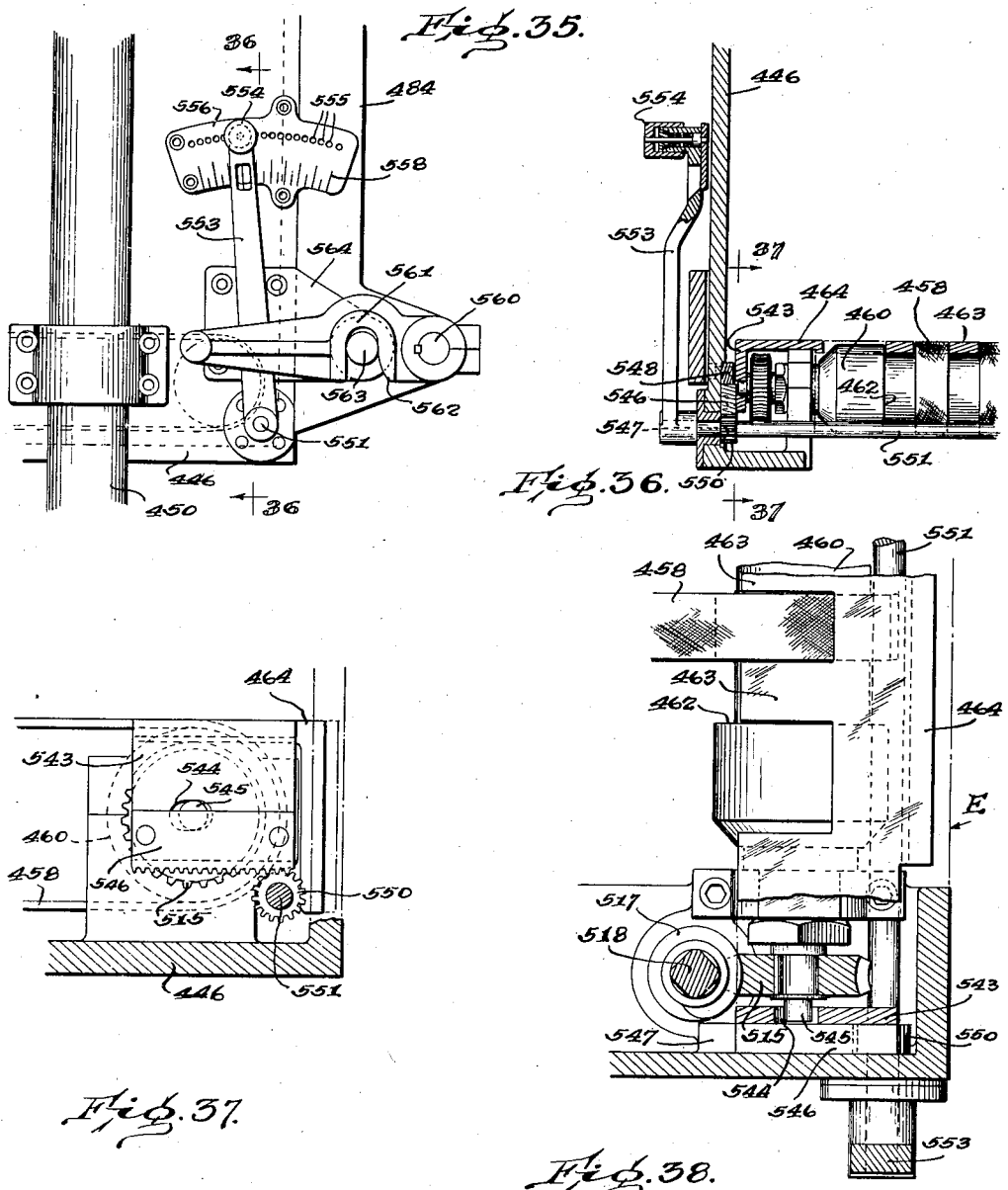

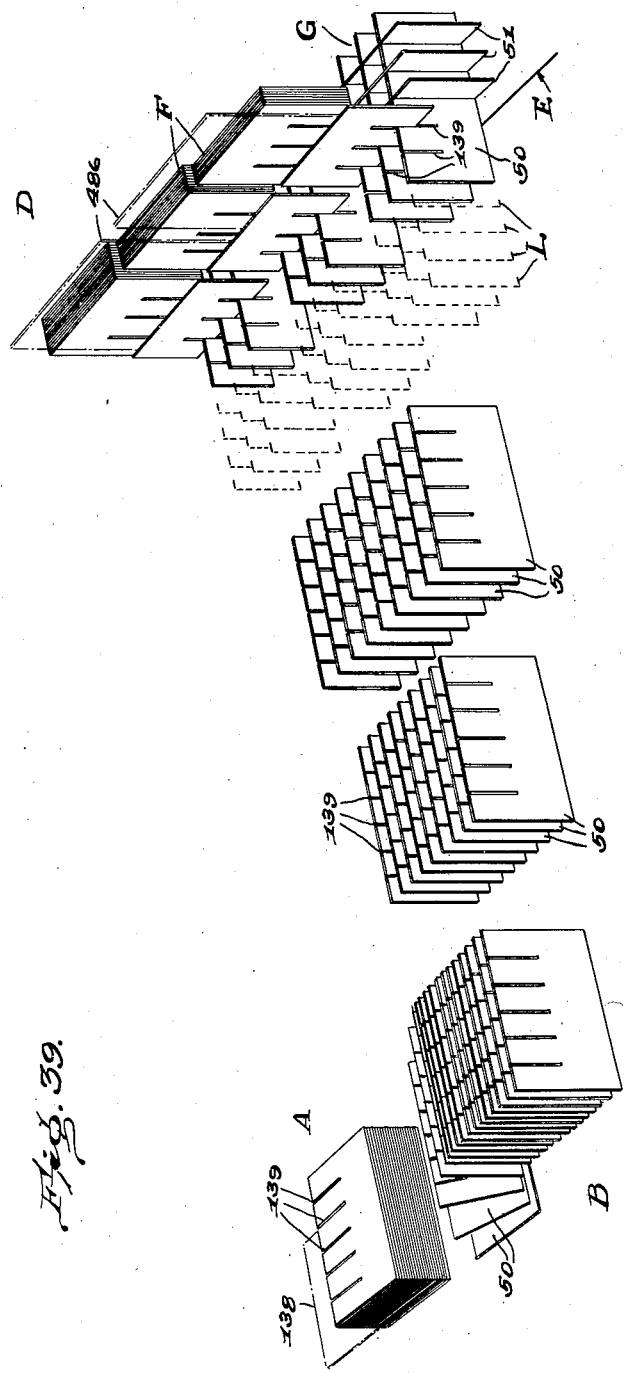

Patented Sept. 22, 1942

2,296,758

UNITED STATES PATENT OFFICE 2,296,758

MACHINE FOR ASSEMBLING CARTON PARTITIONS

Paul C. B. Allen, Toledo, Ohio, and Julius E. Wilske and Francis A. McCormick, Alton, and Albert S. Jackson, Wood River, Ill., assignors to Owens-Illinois Glass Company, a corporation of Ohio Application February 26, 1941, Serial No. 380,678

32 Claims. (Cl. 93—37)

The present invention relates to improvements in machines for automatically assembling strips of fiber, corrugated paperboard or other material in the form of carton partitions.

In general, paper carton partitions of a collapsible nature are formed by two sets of strips crossing each other normally at right angles and so joined as to produce a cellular form adapted to be placed in a carton or box for the protection of frangible articles packed or stored therein. Some machines now in use for performing the above specified function employ strips of the required dimensions severed from a continuous length or roll of the material. Such material should be of a solid fiber or "chip" board type which may be readily rolled or coiled. Another type of machine employs double faced corrugated paperboard which, not being suitable for rolling or coiling, must be fed to the machine in flat strips usually preformed and slotted to proper size. It is an object of the present invention to provide a machine in which either type of material may be used after first being cut into strips of the proper size.

Another object of the invention is to provide a machine which will automatically and continuously withdraw preformed and slotted strips from separate supplies or stacks of material, arrange the strips from one stack in sets or groups and assemble them with strips from another supply into complete partition units.

Another object is the provision of novel and reliable means for varying the number of strips in each set.

A further object of the invention is the provision of means for automatically indexing the selected sets of strips from one source of supply as they are assembled with strips from another source.

A further object of our invention is to provide a partition assembling machine adapted to simultaneously assemble a plurality of partitions, each comprising longitudinal and transverse strips.

A further object of the invention is to provide such a machine in which the number of individual strips in a partition may be adjustably varied and in which the number of strips forming each partition may be different from the number in the other partitions which are being simultaneously assembled.

A further object of our invention is to provide a partition assembly machine in which partitions are fed from a supply pack or stack, arranged in groups, the groups thereafter divided into sub-groups, and each sub-group assembled with transverse strips to complete the partitions.

Other objects will be in part apparent and in part pointed out hereinafter.

In the drawings:

Fig. 1 is a side elevational view of a portion of the machine designated as the delivery end at which the longitudinal and transverse partition strips are assembled and from which the assembled partitions are delivered.

Fig. 2 is a similar view of the accumulator end of the machine where the longitudinal strips are accumulated in groups, which view taken with Fig. 1, presents a complete side elevation of the machine.

Fig. 3 is a plan view of the delivery end of the machine.

Fig. 4 is a similar view of the accumulator end which taken with Fig. 3, forms a complete plan view of the machine.

Fig. 5 is an end elevational view of the delivery end of the machine.

Fig. 6 is a vertical sectional view through the base taken substantially on line 6—6 of Fig. 5.

Fig. 7 is a vertical transverse sectional view taken on line 7—7 of Fig. 1.

Fig. 8 is a vertical sectional view through the accumulator drive gear box taken on line 8—8 of Fig. 4.

Fig. 9 is a vertical sectional view taken on line 9—9 of Fig. 8.

Fig. 10 is a similar view taken on line 10—10 of Fig. 8.

Fig. 11 is a vertical sectional view through the accumulator feed mechanism taken substantially on line 11—11 of Fig. 4.

Fig. 12 is a vertical sectional view through the feed conveyor and transfer mechanism and is taken on line 12—12 of Fig. 4.

Fig. 13 is a vertical transverse sectional view through the transfer mechanism taken on line 13—13 of Fig. 4.

Fig. 14 is a horizontal sectional view through a portion of the drive gearing, taken substantially along line 14—14 of Fig. 2, a portion also of said mechanism being shown in Fig. 1.

Fig. 15 is a side elevational view of a portion of one of the paper guide tracks.

Fig. 16 is a plan view of the same.

Fig. 17 is a sectional elevational view through the guide with one side removed.

Fig. 18 is a sectional view taken on line 18—18 of Fig. 15.

Fig. 19 is a side elevational view of a portion of the machine showing particularly the indexing fingers and pusher bars and their operating mechanisms.

Fig. 20 is a vertical sectional view through the delivery mechanism gear box taken on line 20—20 of Fig. 2.

Fig. 21 is a vertical sectional view through the pusher bar mechanism taken on line 21—21 of Fig. 19.

Fig. 22 is a vertical sectional view through the finger withholding mechanism taken on line 22—22 of Fig. 19.

Fig. 23 is a vertical sectional view taken on line 23—23 of Fig. 22.

Fig. 24 is a vertical sectional view through the indexing finger mechanism taken on line 24—24 of Fig. 19.

Fig. 25 is a plan view of one of the indexing fingers in a position assumed during the forward stroke.

Fig. 26 is a similar view of the finger during its return stroke.

Fig. 29 is a sectional elevational view showing the paper guide holders and associated parts, the view being taken on line 29—29 of Fig. 27.

Fig. 30 is a sectional plan view taken on line 30—30 of Fig. 29.

Figure 31:
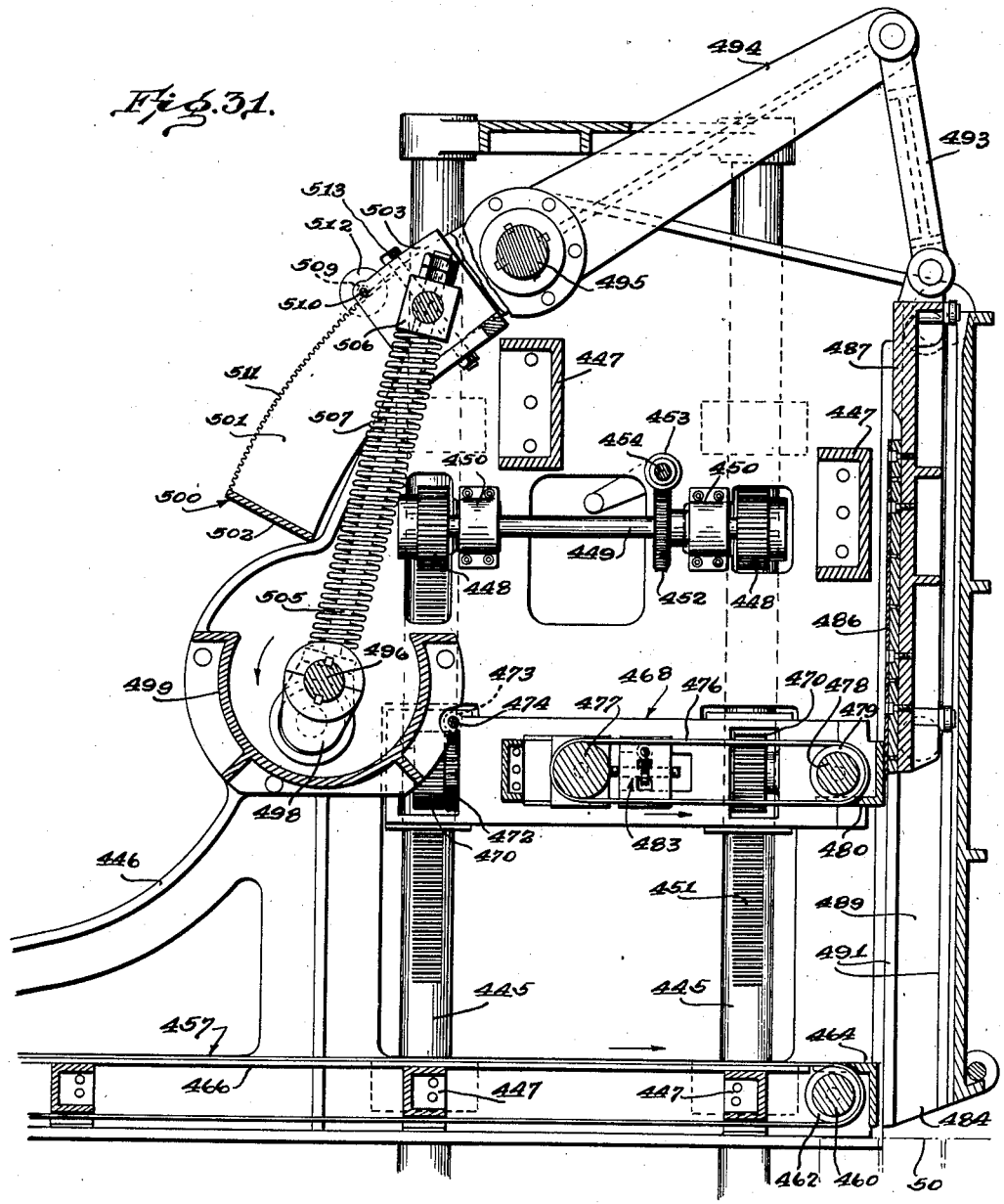
Fig. 31 is a vertical sectional view of the assembly head taken on line 31—31 of Fig. 5.
Figure 32:
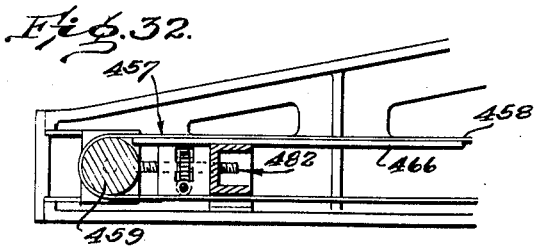
Fig. 32 is a vertical sectional view taken on line 32—32 of Fig. 3.
Figure 33:
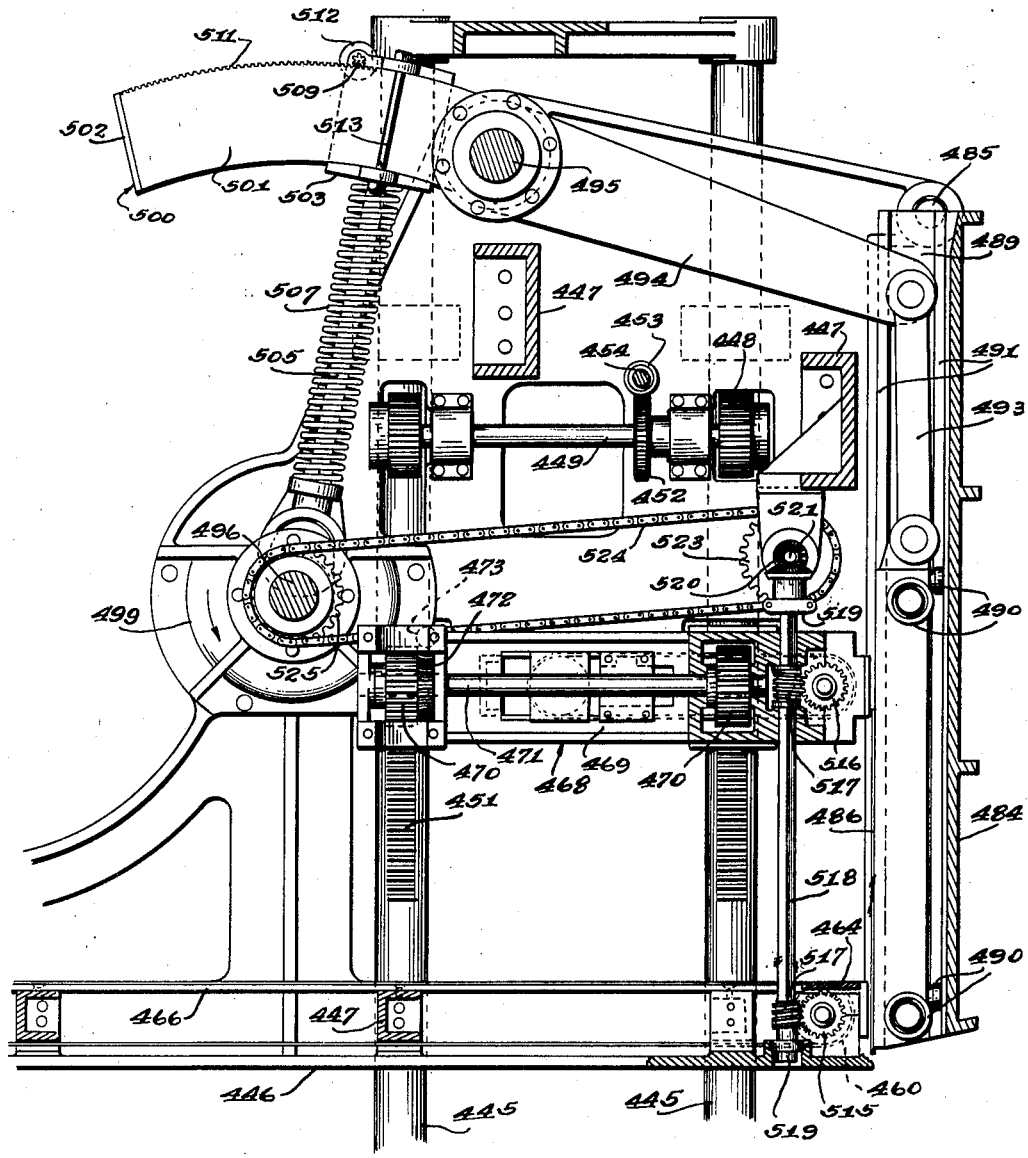

Fig. 33, similar to Fig. 31, is taken on line 33—33 of Fig. 5.

Figure 34:
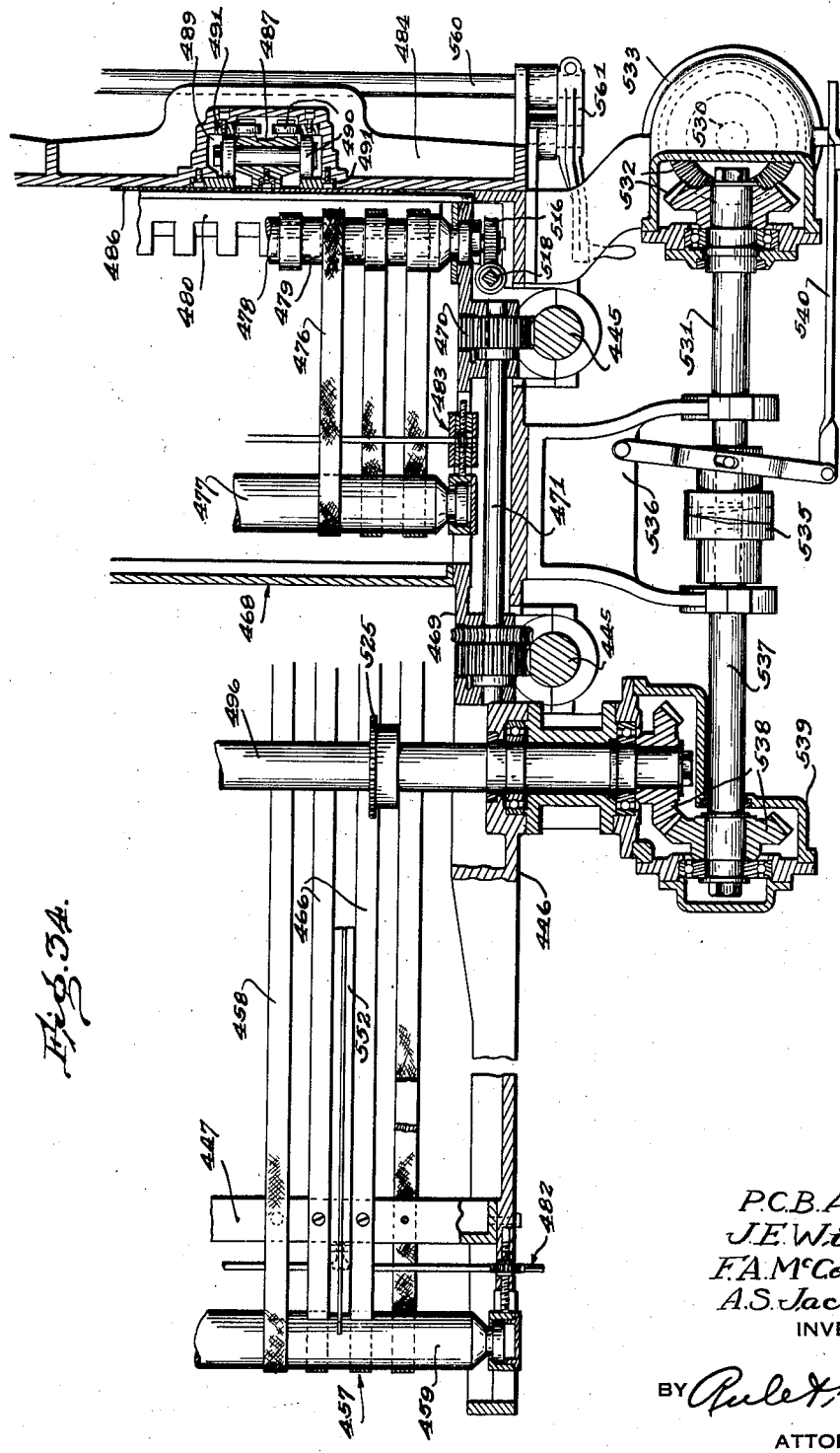

Fig. 34 is a sectional plan view taken substantially on line 34—34 of Fig. 1.

Fig. 35 is an elevational view of the mechanism for adjusting the conveyor transfer plate.

Fig. 36 is a vertical sectional view taken on line 36—36 of Fig. 35.

Fig. 37 is a sectional view taken on line 37—37 of Fig. 36.

Fig. 38 is a sectional plan view of the transfer plate and conveyor drive mechanism; and Fig. 39 is a diagrammatic view illustrating in perspective the movement of the paper through the machine.

The general scheme by which the liner strips are fed through the machine, spaced, grouped and assembled to form the completed partitions will be understood by reference to Fig. 39. The strips are slotted and cut to the size required for the partition to be assembled, before being supplied to the machine. As here shown a stack A of strips 50 is placed in a magazine at the accumulator end B of the machine. The strips 50 are for convenience referred to herein as the longitudinal strips and are adapted to be assembled with strips 51, designated transverse strips or cross-strips. The term "paper" as applied to these strips is intended to include any of the various types of fiberboard and strawboard, either solid or corrugated from which carton partitions may be formed and which are adapted to be handled by the present machine.

The longitudinal strips 50, stacked in the magazine in a horizontal or recumbent position, are fed horizontally one by one from the bottom of the stack to a cross-feed conveyor C (Fig. 11) and by said conveyor are swung to an upright position with the strips supported on edge and their notched edges uppermost. The cross-conveyor is moved step by step as the strips are fed thereto. When a predetermined number of strips has thus been accumulated in upright position, they are moved forward off the cross-conveyor in a group and by intermittent step movements are advanced toward the assembly end D of the machine. As indicated in Fig. 39, the machine is designed and adjusted to advance the strips in groups of 9 strips each. As the groups of longitudinal strips are advanced, they may be segregated into a plurality of sub-groups. As shown, each group is divided into three sub-groups of three strips each. During the operation of assembling the longitudinal and cross-strips at the assembly end D of the machine, the longitudinal strips are advanced in short step movements, each equal to the distance between two adjoining slots or kerfs 139. At the vertical plane (designated the assembly line E), at which the strips are assembled, the cross-strips are fed downward from stacks F. As shown, three cross-strips, namely, one for each sub-group of longitudinal strips, are moved downward simultaneously to assembled position, this operation being repeated after each step movement of the longitudinal strips across the assembly line E. In this manner three of the complete partitions G are assembled concomitantly.

The apparatus is designed for adjustment to accommodate paper strips of different sizes throughout a wide range, permitting an equally wide variation in the size of the assembled partitions. As herein illustrated and described, the machine is adjusted to simultaneously assemble three partitions G, each having three longitudinal strips and five transverse strips. The partition when positioned within a carton thus provides 24 individual cells. The machine may be adjusted to increase or reduce the number of either the longitudinal or transverse strips, or both. The particular machine illustrated is adapted to supply a maximum of 12 longitudinal strips in each group but the principle may be utilized to produce machines having either greater or less capacity.

As shown in Figs. 2 and 4, the magazine for holding the stack A of longitudinal strips comprises vertical bars 149 arranged to engage the ends and the outer side of the stack. The strips 50 are fed from the magazine to the cross-conveyor C (Figs. 4 and 11) by mechanism including a horizontally reciprocating pusher plate 138 which transfers the strips one at a time to the holding fingers 120 of the conveyor C as more fully described hereinafter. The step by step movement of the conveyor brings the strips to upright position in line with horizontally disposed strip guides or tracks 153 (Figs. 4 and 3). The group of strips thus accumulated on the conveyor are pushed off the conveyor onto the tracks and advanced step by step along the tracks by means of pusher bars 230, 231 and 232. The tracks 153 are fanned outwardly and forwardly in a manner to spread the group of longitudinal strips and divide them into sub-groups preparatory to receiving the transverse strips at the assembly line E.

The final forward step movement of each group of longitudinal strips by means of the pusher bar 232 brings the first transverse row of slots 139 up to the assembly line E (Fig. 39) to receive a transverse strip 51 which is now moved downward to assembled position. The step by step movement of the group of longitudinal strips during the assembly operation brings successive transverse rows of the slots therein into position to receive the transverse strips, such step by step movement being effected by means of indexing fingers as hereinafter described. The operation of the machine is such that following the insertion of the last transverse strip in the partition, the succeeding group of longitudinal strips contacts and ejects the assembled partition G, removing it from the tracks. The partition is finally removed from the machine by an endless conveyor.

Machine drive

A detailed description now follows:

The assembly mechanism (to be described later) located at the front end D of the machine, is supported on a hollow rectangular base 52 (Figs. 1, 5, 6, and 7) having front and rear walls 53 and 54 respectively and side walls 55 and 56, which base forms a housing for the machine drive mechanism. The driving mechanism comprises a motor 58 connected through variable speed mechanism 59 to drive the main power supply shaft 60 (Figs. 1 to 4 and 7) mounted outside the base on the wall 55. The driving connections for the shaft 60 include a chain belt 61 trained over a sprocket pulley 62 keyed to the shaft 60. Adjusting means 64 (Figs. 1, 3) carried by the shaft 60 for manually rotating the shaft when making adjustments or resetting the machine, is bolted to the wall 55 of the base. A hand wheel 65 (Fig. 1) connected with the variable speed mechanism 59 may be employed to adjustably regulate the speed at which the machine is operated.

A base member 68 (Figs. 2 and 4) having an inner or front wall 69, rear wall 70 and side walls 71 and 72, forms the support for the accumulator end B of the machine. Channel shaped side rails 75 which support much of the paper handling mechanism to be described presently, connect the base members 52 and 68 and are secured by bolts to the walls 54 and 69. Power for driving the accumulator mechanism is transmitted from the shaft 60 through a secondary drive shaft 76 disposed beneath the shaft 60 and connected at one end thereto by gearing 77 (Figs. 1 and 7) supported in a housing 78 mounted on the wall 55 of the base. The opposite end of the shaft 76 is supported in a gear casing 80 (Figs. 2, 12 and 13) mounted on the base 68 and has driving connection through gearing 81 with an intermediate universal shaft 82 which in turn drives the control mechanism 83 of the cross-conveyor C (Figs. 2, 4, 8, 9 and 10).

Accumulator

The mechanism 83 for driving and controlling the cross-conveyor is housed in a casing 85 supported on the outer end wall 70 of the base 68. A shaft 86 (Figs. 8 and 10) journalled in a slide member 87 mounted within the casing 85, is connected to and is driven by the shaft 82 (Fig. 2). The shaft 86 carries a gear 88 adapted to mesh with a gear 89 mounted on a shaft 90 which is supported within the casing. The gears 88 and 89 are readily removable and may be replaced by gears of a different ratio according to the type of partition being produced, the said gears governing the speed and number of strips to be accumulated and transferred from the conveyor. When the gears are replaced by others of a different size, necessary adjustment of the slide 87 is made by adjusting means comprising a threaded shaft 92 and hand wheel 93. Indicating mechanism 94 driven from the shaft 92 is provided to show the required position of adjustment of the slide 87. The slide 87 is locked in position after adjustment by means of a wedge block 91 (Fig. 8) and threaded rod 91ᵃ which extends through the wall of the casing 85.

The shaft 90 also carries a gear 95 constantly meshing with a gear 96 mounted within the casing, the gear 96 being secured on one end of a drive shaft 97 which drives mechanism for feeding strips to the cross-conveyor C. The shaft 97 extends forwardly from the gear case 85 and its forward end (Figs. 11, 12) is journalled in a bracket 98 mounted on the wall 69 of the base. A crank 100 on the end of the shaft is turned in a clockwise direction as viewed in Fig. 11 and transmits a reciprocating motion through a connecting rod 101 to a conveyor feeding mechanism 102 (Fig. 11) which will be described presently.

The gear 95 (Figs. 8 and 9) also meshes with a gear 105 keyed on a stub shaft 106 journalled within the casing 85. The shaft 106 carries the continuously rotating driving member 107 of a selector unit in the form of a "Geneva" drive, the driven member 108 of which is keyed to a shaft 109 and rotated in step by step fashion. A gear 110 keyed to the shaft 109 meshes with a gear 111 carried on the outer end of a conveyor drive shaft 112 (Figs. 8, 11, 12) on which one ond of the conveyor C is mounted. It will be observed (see Fig. 8) that the Geneva drive shaft 106 and the shaft 97 are both driven from the gear 95 and at the same angular speed, so that the step movements of the cross-conveyor C (Fig. 11), driven from the Geneva drive, are synchronized with the operations of the feeding mechanism driven from the shaft 97.

The conveyor C (Figs. 4, 11, 12 and 13) receives the strips 50 from the feeder mechanism, swings them from a recumbent to a standing position and accumulates them in groups preparatory to being advanced to the assembly mechanism. The conveyor is supported on the drive shaft 112 and idler shaft 113 indicated in Fig. 13 and comprises a pair of chains 115 trained over sprockets 116 keyed to the shafts. Spacing bars 119 are secured to the chains at each link to form an unbroken surface as they move along a horizontal path and are provided with pairs of outwardly projecting sheet metal fingers 120, each pair adapted to receive in a slot 117 formed therebetween a single longitudinal partition member 50. The edges of each pair of fingers along the sides and outer ends of the fingers are curved outwardly to abut and match with the edges of adjacent finger members to eliminate sharp edges which might interfere with the operation of the paper transfer mechanism to be described presently. The ends of the bars 119 extend outwardly beyond the chain and are adapted to ride over rails 122 (Fig. 12) to prevent tilting or rocking of the bars and thereby maintain the fingers 120 in upright position while traveling in a horizontal path through the transfer zone. A gib 123 further aids in maintaining the alignment of the fingers. The conveyor C traveling in a closed path, operates in a clockwise direction (Fig. 11) away from the feeding mechanism 102. The intermittently driven selector 108 (Fig. 8) moves the conveyor one finger space at each step, thereby bringing each finger in succession to horizontal strip receiving position.

Feeding mechanism

The feeding mechanism 102 (Figs. 2, 4 and 11) comprises a horizontally disposed platform 125 supported on brackets 126 bolted to the end wall 71 and side walls 69 and 70 of the base 68. The platform is provided with a channel 127 extending longitudinally thereof adapted to receive therein a reciprocable pusher plate carriage 128 having rollers 129. The carriage is provided with an ear 130 extending downwardly through a slot 131 in the platform and connected by a pivoted link 132 with the upper end of a crank arm 133. The arm 133 is keyed to a shaft 135 supported in brackets 136 on the wall 71. A second and shorter arm 137 also keyed to the shaft 135 is pivoted to and driven by the connecting rod 101. Thus it will become apparent that rotation of the feed drive shaft 97 operating through the crank 100 transmits a rocking motion to the shaft 135 which in turn causes in and out movement of the carriage 128 between the full line and the broken line positions shown in Fig. 11. A rectangular pusher plate 138 overlies the platform in close proximity thereto and is adjustably secured to the carriage. It may be readily adjusted to accommodate the various widths of strips being fed to the conveyor. The stack A of strips is placed in a magazine comprising the vertical guide bars 140, with the slots in the strips directed outwardly. The bars 140 are adjustably supported on bars 141 which in turn are carried by brackets 142 bolted to the side walls 69 and 70. The pusher plate 138 having less thickness than the strips to be fed, removes one strip at a time from the bottom of the stack and projects it into the slot 117 of the finger 120 which is in alignment therewith and while the conveyor is at rest.

Transfer mechanism

The transfer mechanism by which the groups of accumulated strips are transferred from the cross-conveyor C to the tracks 153 will now be described. The relative size of the gears 88 and 89 (Fig. 8) controls in part the number of strips removed at a time from the conveyor C by the transfer mechanism 145 (Fig. 12). As previously mentioned, the apparatus as shown in the drawings is adjusted to handle a group of nine of the longitudinal strips 50 at a time. Thus, it will be noted, the conveyor C will index through nine steps before the transfer operation begins, a description of which follows:

The transfer mechanism includes a slide block or transfer head 148 (Figs. 4, 12, 13) mounted to reciprocate lengthwise of the machine, that is, transversely in relation to the movement of the cross-conveyor, on a bar 149 supported thereover on inverted U-shaped frame members 150 and 151 which, together with the bar 149, provide a carrier frame 147 for the slide block 148. The slide block 148 is provided with a plurality of relatively thin downwardly extending pusher fingers 152 which (see Figs. 11, 12, 13) are adapted to pass longitudinally through the slots 117 of the conveyor fingers 120 and thereby move the strips 50 from the conveyor into the paper guides 153 or tracks (Fig. 4) along which the strips are moved through the machine. The fingers 152 have enlarged tip portions 154 which prevent the possibility of the fingers overriding or slipping past the paper strips during the transfer movement when relatively thin stock is being used. Grooves 155 (Fig. 11) in the conveyor fingers 120 provide additional space for passage of the enlarged tips through the slots.

The carrier frame 147 is mounted for limited movement with and parallel to the line of travel of the conveyor in slideways 157 in the wall 70 and in a bracket 158 bolted to the wall 69. Each of the frame members 150, 151 is provided with rack teeth 159 (Figs. 11 and 12) which mesh with spur gears 160 keyed on a shaft 161 which is journalled in the walls 69 and 70. Movement of the carrier frame 147 with the conveyor is effected and controlled by rotation of the shaft 161 in a manner presently to be described, this movement being such that transfer of the strips from the conveyor to the guides 153 may be accomplished without interfering with the coincident movement of the conveyor.

The shaft 161 is driven from the conveyor drive shaft 112 through a train of gearing including a gear 163 (Figs. 11, 13) mounted on the conveyor drive shaft 112 and meshing with a gear 164 on a shaft 165 journalled in the wall 69. A gear 166 also secured to the shaft 165 is adapted to be engaged periodically by a rack 168 (Figs. 12, 13) for driving the rack. The latter is formed on or carried by a slide plate 169 which is mounted for vertical movement in a slide member 170, the slide plate 169 being periodically moved up and down by means presently to be described, for moving the rack into and out of engagement with the gear 166. The slide plate 169 serves as a driving element for moving the slide member 170 horizontally, the member 170 being mounted for such horizontal movement in slideways 171 on the wall 69. The slide member 170 is provided at its upper edge with rack teeth 172 which mesh with a gear 173 on one end of the shaft 161. It will be seen that when the rack 168 is in mesh with the gear 166, the intermittent motion of the conveyor transmitted through gears 163 and 164 to the shaft 165 will be further transmitted through the slides 169 and 170, rack 172 and gear 173 to the shaft 161 and gears 160 to move the carrier frame 147.

The vertical movement of the slide plate 169 is controlled by mechanism including a plate 175 (Figs. 12, 13) bolted to the slide plate and projecting through an opening formed in the slide member 170. A substantially cylindrical bar 176 carried by the plate 175 is adapted to run between rollers 177 carried by the forked end of a lever 178 which is pivoted at its other end to a bracket 179 supported from a base channel brace member 180. Movement of the lever 178 about its pivot is effected by an air operated motor 182 mounted on the base wall 69.

Operation of the motor 182 is controlled by a master valve 183 (Fig. 13) of spool construction and trip valves 184 and 185. The valve 184 is connected to one end of the master valve and operates to shift the valve core to the left (Fig. 13) so that air pressure is supplied to the upper end of the motor cylinder, whereby the motor operates to lower the yoke 178 for engagement of the rack 168 with the gear 166 for indexing the carrier frame 147. The trip valve 185 is connected to the opposite end of the master valve to shift the core to the position shown in Fig. 13 so that the motor 182 is reversed and lifts the rack 168 off the gear 166. This permits the frame 147 to be returned to the starting position of the transfer cycle. This return is effected by an air motor 186 (Figs. 2 and 4) mounted on the wall 70 of the base and connected to the carrier 150. Air is supplied to one end of the motor 186 from the valve 183, both air motors operating simultaneously during the return or idle stroke. During the indexing movement the motor 186 is vented to the atmosphere to permit a free stroke as the carrier frame 147 advances.

Mechanism for effecting the transfer of the strips from the cross-conveyor to the assembly mechanism further includes a shaft 190 (Figs. 12, 13 and 14) disposed at right angles to the main drive shaft 60 from which it receives power as will be brought out hereinafter. A valve operating pin 187 (Fig. 13) secured to the shaft alternately actuates the valves 184 and 185. Means for reciprocating the transfer head 148 on the bar 149 includes a transfer operating cam 191 keyed to the shaft 190 and supported in a casing 192 carried by a plate 193 which is bolted between the base wall 69 and the brace 189. A cam slide 195 mounted within the casing carries a roller 196 in engagement with the cam and by which the slide is given a reciprocating motion. An upwardly extending crank arm 197 pivoted to the casing 192 is connected to the slide 195 by a pivoted link 198. The upper end of the arm 197 is connected by means of a link 199 with a rack member 200 slidably mounted within a casing 202 which is supported on the plate 193. The rack drives a pinion 203 mounted on one end of a shaft 204 supported in the casing, the other end of the shaft having a gear 205 secured thereto. The gear 205 meshes with one of a pair of pinions 206 carried by a shaft 207, the other of said pinions meshing with and driving a rack 209 also mounted in the casting. A connector 210 yieldably secures the rack 209 with a draw bar 211 which has one end pivoted to the transfer head 148. A spring pressed detent 212 in the connector, seating in a recess 213 in the bar, is adapted to release when an abnormal resistance to movement of the draw bar 211 is encountered, as, for example, when undue pressure caused by accidental jamming of the paper in a slot or slots 117 interferes with the movement of the pusher fingers 152. In order to preserve constant alignment of the paper guide tracks 153 (Fig. 13) with the slots 117 of the cross-conveyor fingers, the ends of the track members (Figs. 15 to 18) are held within the carrier frame 147 by means of a threaded rod 215 (Fig. 13) threaded through one leg of the carrier to press the guides against the opposite leg. Horizontal alignment of the track ends is maintained by a key 216 fixed to the carrier and which engages in a slot 217 formed in each track member.

Each track or guide 153 (Figs. 15 and 16) for the greater part of its length comprises a pair of relatively flexible sheet metal strips 219 held apart in substantially parallel relation by a series of rollers 220 over which the paper strips are propelled. The strips 219 terminate short of the end of the track and have a spacing member 221 riveted therebetween. A tongue 222 formed on the member 221 projects forwardly and is slidably received in a slot 223 formed in a complementary spacing bar 224. A portion of the lower edge of the strips 219 is cut away, the remaining upper edge overlying the tongue and offset outwardly to overlap corresponding lengths of strips 225 forming part of the receiving end of the track. Side plates 227 riveted through the strips 225 and bar 224 provide a rigid construction by which the tracks may be secured to the carrier frame 147.

As the carrier frame 147 is indexed step by step transversely of the machine during the transfer operation, it carries with it the rear ends of the tracks 153 while their forward ends are held in fixed position. This causes the effective length of the tracks to vary. During such movement, the tongue 222 slides within the slot 223 and the overlapping strips 219 and 225 maintain a continuous unbroken guiding surface for the paper.

The shaft 190 makes one revolution during each transfer cycle, i. e., one complete reciprocation of the head 148 (Figs. 4 12, 13). The cycle may be said (as illustrated herein) to commence when nine of the strips 50 have been carried by the conveyor to a position in front of the fingers 152. A trip valve operating pin 187 on the shaft 190 actuates the valve 184 and supplies air pressure for shifting the spool valve 183 to the left (Fig. 13), thereby causing the air motor 182 to lower the slide 169 and engage the gear 166 and rack 168 for indexing the carrier C. During this indexing movement the cam 191 operates through its associated mechanism to draw the head 148 to the broken line position in Fig. 12 and push the paper strips into the guides 153. As the valves 185 and 183 are operated, the air supply through pipe line 183ᵃ (Figs. 13, 4) from valve 183 to the rear end of the motor 186 is shut off, which allows the carrier to advance unimpeded. Upon completion of the return stroke of the head 148, the valves are again operated, the rack 168 and gear 166 being disengaged and the air motor 186 returning the carrier to the starting position.

*Paper delivery*

After each set of the longitudinal partitioning strips 50 has been transferred to the paper guides 153, they are engaged and pushed forward by one of a series of pusher bars 230, 231 and 232, which, as shown in Figs. 3 and 4, extend transversely of the machine at different positions of advancement. The pusher bars are operated by mechanism, illustrated particularly in Figs. 12 to 14, 19 and 21, to advance the groups of strips 50 along the tracks by steps toward the assembly end B of the machine. The delivery mechanism includes gearing within a change gear box 234 or transmission casing (Fig. 14) disposed in alignment with the drive shaft 60 and supported in part by the side rail 75. The shaft 60 enters one end of the box 234 and carries on its inner end gears 235 (Fig. 14) adapted to mesh selectively with gears 236 supported thereabove on a manually adjustable slide member 237 which has an adjusting handle 238 (Figs. 14, 19) mounted on the outside of the box. The gears 236 are slidably splined on a counter shaft 240 for movement lengthwise thereof, the counter shaft being supported in bearings 241 in parallel alignment with the shaft 60. A bevel gear cage 242 (Figs. 14, 20) slidably mounted in slideways 243 is attached to one end of the shaft 240 and also carries one of a pair of mitre gears 244, the other of which is carried on a shaft 245 within the cage. A spur gear 246 keyed to the shaft 245 is adapted to mesh with a gear 247 removably fixed on the end of the shaft 190 above referred to. The gear 247 is replaceable with other gears of different sizes, thereby providing means to change the speed ratio between the shafts 60 and 190, in addition to the speed changing means provided by the gearing 235 and 236.

The positioning of the cage 242 is controlled by a rack 250 bolted thereto (Fig. 20) and meshing with a segmental gear 251 keyed to a shaft 252 which extends upwardly through the top of the casing. A manual adjusting handle 254 fixed to the shaft retains the cage in the selected position.

As the mechanism is operated, the pusher bars 230, 231 and 232 are moved forward by mechanism including a cam 255 (Figs. 13, 14) keyed to the shaft 190 within a casing 256 bolted between the gear box 234 and side rail 75. A cam slide 258 mounted within the casing is provided with a roller 259 running in a path 260 formed in the cam and is connected by a pivoted link 261 with a crank arm 262, mounted within the casing on a shaft 263. The shaft extends outwardly from the casing and carries an upwardly extending operating lever 264 (Figs. 14, 19). During rotation of the cam 255, the slide 258 is reciprocated which produces a rocking motion of the shaft 263 and lever 264.

The lever 264 is adjustably connected to a rack bar 266 by a connecting rod 267 pivoted at one end to a slide block 265 carried by the lever and adjustable longitudinally thereof by means of an adjusting rod 265ª. The rack bar is slidably mounted in a casting 268 bolted to the side rail 75 and engages a pinion 269 keyed to the end of a shaft 270 (Figs. 19, 4, 21) journalled in the casting. The shaft extends across the machine and has its other end journalled in a casting 271, similar in form to the casting 268. Gears 273 (Fig. 21) keyed on the shaft 270 are adapted to drive rack bars 274 (Figs. 13, 21) mounted within the castings 268 and 271.

Each rack bar 274 carries a screw-threaded rod 275 (Figs. 3, 19, 21) supported between brackets 276 bolted to the rack bar. Guide members 278 carried on the rods 275 are provided with upwardly extending slots 279 inclined slightly rearwardly so that upward movement of the pusher bars by the elevating mechanism, draws them away from the edge of the strips, as will become apparent presently. The pusher bars 230 and 231 are supported by brackets 280 which are provided with rollers 281 (Fig. 21) operating in the slots 279. The bar 230 (see Figs. 4, 13) is of necessity supported only at one side to enable it to pass the casting 202 as it advances the paper. The brackets 280 carrying the bar 231 are provided with forwardly projecting threaded rods 283 adapted to adjustably support brackets 284 carrying the bar 232. The bar 232 is thus adjustable independently of the bar 231 to accurately position the strip 50 at the assembly point E.

Means for adjusting the brackets 284 on the rods 283 includes sprockets 285, one of which is threaded on the rod within the bracket and the other supported by the bracket and geared to an adjusting rod 286 (Fig. 3), a chain 287 providing driving connection therebetween. The pusher bars 230, 231 and 232 are adjustable as a unit (see Figs. 3, 19) by means including bevel gears 289, one of which is threaded on the rod 275 and the other carried on the guide member 278. Sprockets 290 connected by a chain 291 provide driving connections between said bevel gears and an adjusting rod 292 which carries the upper sprockets and extends across the machine and serves as a tie rod and brace for the upper ends of the guides 278.

Pusher bar elevating mechanism

The pusher bars when in motion follow a substantially rectangular path being raised at the end of the forward stroke, returned while elevated, and then lowered to the starting position in readiness for the next forward movement. Mechanism for controlling the raising and lowering of the bars includes a cam 295 keyed to the shaft 190 (Figs. 12, 13, 14 and 19) within a casing 296 positioned on the inner side of the rail 75 (Figs. 13, 14). A cam slide 297 slidably supported within the casing carries a roller 298 running in a path 299 formed in the cam. The slide is connected to a pair of levers 300 and 300ª pivotally mounted on the rail 75, a rod 301 providing a connection between the levers. Each lever is provided with gear teeth 302 meshing with a segmental gear 303, the gears 303 being carried by elevating shafts 304. The shafts 304 are journalled in the rails 75 (Figs. 3 and 4) and carry on their outer ends crank arms 305 (Figs. 4, 12, 19).

The pusher bars are moved up and down together by means of rollers 307 carried by the brackets 280 and 284 and running in horizontally disposed channel shaped tracks 308 (Figs. 13, 19). The tracks are supported by brackets 309 movable vertically on guide posts 310, three of which are bolted to the side rails 75, a fourth being secured to the casing 296. Connecting rods 311 pivoted to the brackets 309 and the crank arms 305, raise and lower the tracks 308 as the mechanism is operated.

The sort step by step forward movement of the partition strips 50 during the operation of assembling them with the cross strips is under the control of indexing mechanism illustrated particularly in Figs. 14, 19 and 24 to 30 inclusive. The mechanism includes generally a plurality of finger members 315 mounted in holders 316 and adjustable up and down therein. The fingers are adapted to be oscillated about a vertical axis to move them toward and away from the paper strips to be engaged thereby. The holders are supported by mechanism to be described in detail presently for moving the fingers toward and away from the Assembly Line E (Fig. 19) as the paper is advanced.

Driving means for actuating the finger mechanism includes a cam 318 (Fig. 14) keyed to a shaft 319 mounted within a casing 320 which is secured by bolts to the side rail 75. The shaft extends outwardly from the casing and carries a bevel gear 321 meshing with a similar gear 322 keyed to the main drive shaft 60 and enclosed in a housing 323. A cam slide 325 mounted within the casing carries a roller 326 running in a path 327 formed in the cam. The casing 320 and mechanism therein may be a duplication of the casing 256 (Fig. 14) and mechanism contained therein for reciprocating the pusher bars. The slide 325 is connected by a pivoted link 328 to a crank 329 by which a reciprocating lever 330 (Fig. 19) is actuated. The lever 330 is provided with a movable pivot block 331 held in place and adjustable by means of a threaded screw and adjusting knob 333. Adjustment of the block 331 toward or away from the center about which the lever 330 is rocked varies the stroke of the fingers 315 to accommodate the spacing of the slots 139 formed in the partition strips.

A casting 335 (Figs. 19, 24) bolted to the side rail 75 supports a slide block 336 which is connected to the pivot block 331 by a rod 337. Rack teeth 338 formed on the slide block engage a pinion 339 loosely mounted on a finger drive shaft 340 journalled at one end in the casting 335 and extending transversely of the machine. The opposite end of the shaft is supported in a similarly shaped complementary casting 341 (Fig. 3). A gear 342 (Fig. 24) is keyed to the shaft 340 and is connected with the pinion 339 by means of a stroke adjusting collar 344 keyed to the pinion and secured to the gear by a detent 345. Openings 346 (Fig. 19) are provided in the gear to permit altering the relation between the gear and collar. The gear meshes with rack teeth formed on a rack bar 348 which is mounted in the casting and forms the support for the finger holders and associated mechanism. A clamping block 350 carried by the bar 348 provides a bearing for a finger adjusting shaft 351 extending across the machine parallel with the shaft 340. Gear teeth 352 are cut into the shaft 351 and engage a second rack 353 secured to the top of the bar 348 for adjusting the position of the fingers. The shaft 351 also operates similar mechanism carried by the casting 341. A lock nut 354 on the shaft 351 prevents slipping after the proper setting for the fingers has been determined.

A channel-shaped finger supporting bar 355 (Figs. 24 to 27, 29) is bolted to the blocks 350 and supports, in addition to the finger holders 316, a housing 357 enclosing segmental mitre gears 358 (Fig. 27) through which motion is transmitted for oscillating the holders. One of said gears is secured to a rod 360, square in cross-section and parallel to the channel 355. A square rod 361 secured to the other of said gears 358 extends rearwardly and has telescoping connections with a rock shaft 362 (Figs. 27, 22) mounted in bearings secured to the side rail 75. The shaft 362 is adapted to be rocked by mechanism including a rock arm 364 formed on the shaft and having a depending lug 365 thereon. A spring loaded yielding connector tube 366 connects the arm 364 with a cam slide 368 mounted in a casing 369 bolted to the rail 75 (Fig. 14). The drive shaft 60 passes through the casing and has a cam 370 keyed thereto. A cam roller 371 carried by the slide 368 is adapted to run in a path 372 formed in the cam and indicated by broken lines in Fig. 22.

Rotation of the cam 370 transmits a rocking motion to the rod 361 and oscillates the gears 358 (Fig. 27) and the rod 360, causing the latter to operate through mechanism presently to be described, to swing the fingers 315 toward and away from the strips 50. Each holder 316 (Figs. 25, 26 and 29) comprises a base member 374 slidably retained on the bar 355 and provided with a channel 375 adapted to receive a paper guide track 153. A finger carrying arm 376 is pivoted to swing horizontally about a pivot pin 378 on the base 374 and has one end projecting over the rod 360 and carrying a cam roller 379. A collar 380 slidable on the rod 360 is retained in fixed relation with the base 374 by ears 381 (Figs. 24, 29) formed thereon and overlying either side of a projection 382 formed on the base. Cam walls 384 (Figs. 25, 26) formed on the collar are adapted to swing the arm 376 as the rod 360 is rocked. A spring pressed detent 385 in the arm 376 holds the finger 315 at any height to which it is adjusted.

Figure 27:
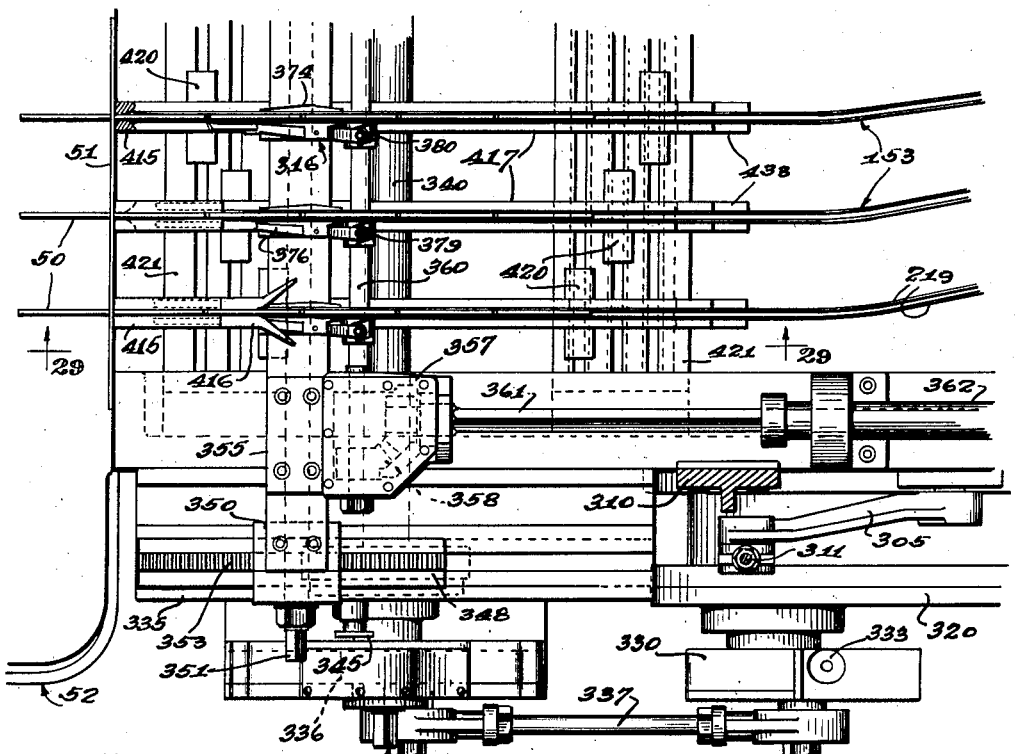
Fig. 27 is a partial plan view of the fingers and associated mechanism.
Figure 28:
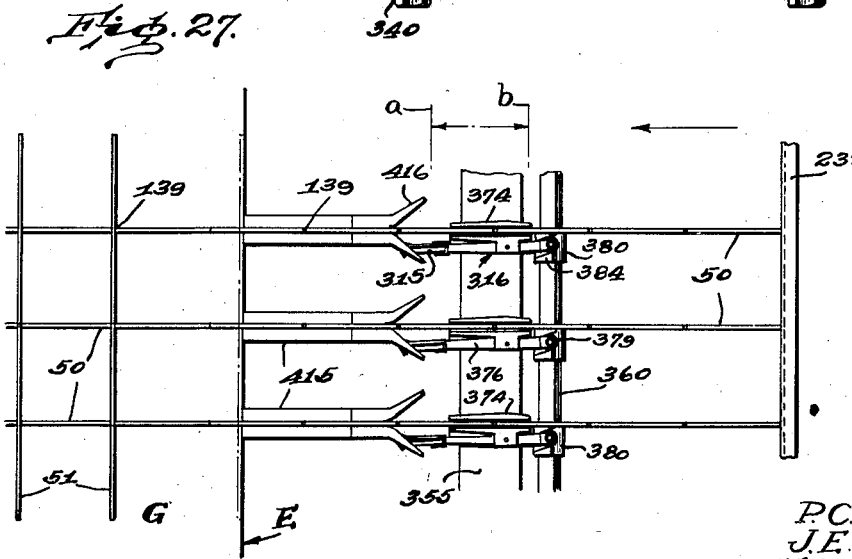
Fig. 28 is a diagrammatic plan view of the same.

Fig. 28 is illustrative of a phase in the indexing cycle depicting the ejection of a completed partition G by a set of the strips 50 as they are advanced by the pusher bar 232 moving in the direction of the arrow. The finger mechanism moves within the limits of the broken lines a, b, and at this time is traveling forward or toward the left hand with the fingers 315 swung away from the strips and held inoperative by mechanism shown in Figs. 14, 22 and 23. It will be noted that with the oncoming set of strips 50 in engagement with the strips 50 of the assembled partition, there is a double space between the last assembled cross-strips 51 and the first row of slots 139 for the next assembly. In order that the constantly running assembly mechanism, to be described later, does not discharge a transverse partition member 51 between the abutting ends of the longitudinal strips, the pusher bars are adapted to operate at twice the lineal speed of the indexing mechanism, permitting an idle forward stroke of the fingers.

The fingers are periodically held in the position shown in Fig. 26 by means including a vertically disposed rod 387 (Figs. 22, 23) having a yieldable upper end portion mounted within the side rail 75. The lower end of the rod is pivoted to a crank arm 390 secured to a squared shaft 391 mounted parallel with the lower edge of the rail. A sleeve 392 (Figs. 14, 23) slidably supported on the shaft 391 is provided with ears 393 adapted to receive therebetween the upper end of an actuating finger 395 which projects through an opening in the bottom of the rail and is supported in a slideway 396 fixed to the rail. An adjusting screw 397 carried by the slideway is threaded through a boss 398 formed on the finger for moving the sleeve along the rod 391. A screw adjusting rod 399 (Fig. 22) is supported on a casting 400 formed as a part of the slideway 396 and operates through gears 401 to rotate the screw 397.

The sleeve 392 is provided with an ear 403 carrying a cam roller 404 adapted to be engaged by pads 405 or cams formed on a disk 406. The disk is mounted on a shaft 408 (see Figs. 14, 23) supported in a bearing block 409 and is provided with a sprocket 410 driven by a chain 411 trained over a sprocket 412 carried by the shaft 190. The pads 405 vary in length according to the time it is desired to hold the fingers inoperative. When the sleeve and shaft are rocked by a cam pad 405, the rod 387 (Fig. 22) is raised into the path of the lug 365 which is thus prevented from moving, the operating force being absorbed by the connection 366. The shaft 362 is thus held from rocking so that the cam shaft 360 is held from operating the fingers 315 in the manner above described.

*Paper guides and adjustments therefor*

The paper strips 50 are supported during the assembling operation by upright, vertically adjustable guides 415 (Figs. 24 and 27 to 30) each bifurcated to form a vertical slot through which the paper is directed. The upper end portion of each guide member is bent rearwardly at right angles and carries a flared guide tip 416 to more readily receive the advancing paper. Each guide is supported on a bracket 417 adjacent the wall 54 of the base and against which one edge of the guide bears. The vertical line of contact E between the guide 415 and the wall of the base is herein termed the assembly point, as the cross-partitions are assembled at the vertical plane of said line. A toothed shaft 418 mounted in the wall 54 meshes with teeth 419 cut into the guide and is rotatable for vertical adjustment of the guide.

The brackets 417 are individually adjustable horizontally in a direction transversely of the machine to accommodate the various spacings of the longitudinal strips 50. To permit such adjustment, the brackets are provided with feet 420 slidably mounted in guide rails 421 bolted at their ends to rails 75. Each bracket 417 supports an adjusting rod 423 journalled in the ends of the bracket beneath the rails 421 and provided with gear pinions 424 meshing with racks 425 formed on the rails. One end of each rod 423 extends through a slot 426 (Fig. 29) in the wall 54 and has an extension rod 427 connected thereto. The extension rod 427 projects through a slot 428 in the front wall 53 (Figs. 6 and 7) for easy adjustment of the brackets. Gear teeth 430 cut into the rod mesh with a rack 431 to preserve alignment of the rods 423 and 427. The rod 423 passes through an elongated vertical slot 429 (Figs. 29, 30) in the guide 415.

The bracket 417 is provided with an upstanding end 433 (Figs. 27, 29) adapted to receive and hold the paper guide track 153. A spacing bar 434 (Fig. 29) riveted between the side plates 219, is provided at its ends with downwardly projecting latching members 435 and 436. The member 435 engages a groove 437 in a rail 438 secured to the base wall 54. The member 436 holds the track 153 in place by engagement with a spring operated latch 440. Gripping fingers 441 pressed in the side plates 219 of the track exert a holding tension on the paper as it passes therethrough.

*Assembly mechanism*

Referring now to Figs. 1, 3 and 31 to 38 inclusive, the assembly mechanism D comprises vertical columns 445 or guide rods bolted to the base 52 and adapted to support side frames 446 movable up and down thereon and on which the assembly mechanism is carried. The frames which are tied together by upper and lower braces 447 may be adjusted to the required height by means of gears 448 (Figs. 31, 33) on a pair of shafts 449 mounted respectively on the two side frames, the shafts being journalled in bearings 450 bolted to said frames. The gears project through openings in the frames and mesh with rack teeth 451 cut in the rods 445. Each shaft 449 carries a worm gear 452, said gears adapted to be driven by worms 453 on a shaft 454 (Figs. 1 and 3) extending between the frames and having a crank 455 secured to one end thereof.

The lower portions of the side frames 446 extend forwardly and form the support for the outer end of a loading and feed conveyor 457 (Figs. 3, 31, 34). The conveyor comprises a plurality of relatively narrow web belts 458 trained over rolls 459 and 460. The roll 460 is provided with grooves 462 (Figs. 36 and 38) between the belts adapted to receive tongues 463 formed on an adjustably mounted transfer plate 464 (Figs. 38, 31). The plate provides a continuous surface with the belts 458 from which the transverse partition strips 51 are discharged. Belt supporting strips 466 (Figs. 31, 32) fixed to the braces 447 beneath the belts carry the weight of the paper stock placed thereon.

A secondary feed conveyor 468 (Figs. 31, 33) for engaging the top edges of the strips, is mounted between frames 469 supported by and movable vertically on the columns 445 by means of gears 470 mounted in the frame on a shaft 471 and meshing with the racks 451. A worm gear 472 on the shaft is driven by a worm 473 carried by an adjusting shaft 474 and by which the frame is raised or lowered. The conveyor 468 is constructed similarly to the conveyor 457 and comprises narrow belts 476 of webbing (Fig. 34) trained over rolls 477 and 478. The roll 478 is provided with grooves 479 to receive tongues formed on a second transfer plate 480. Manually adjustable belt tighteners 482 and 483 are provided on the lower and upper conveyors respectively to provide proper feeding tension.

Packs of cross-strips are placed on the lower conveyor 457 with the individual strips supported on edge on the conveyor and perpendicular to their direction of movement with the conveyor. The conveyors are driven continuously in the direction indicated by the arrows (Fig. 31), the upper conveyor bearing on the upper edges of the strips. As the belts move faster than the strips are fed forward, their frictional sliding contact with the strips maintains the pack in compact form with the foremost strip of the pack bearing against the front vertical face of a frame 484 which may be referred to as an assembly plate carrier guide frame. The cross-strips are removed singly from the packs by a pair of assembly pusher plates 486, said plates arranged side by side in the same vertical plane (Figs. 3, 31, 33 and 34), said plates being reciprocated vertically as a unit. The guide frame is hinged at its upper edge 485 to permit adjustment of the mechanism carried thereby. The plates 486 which are relatively thinner than the paper being employed are bolted to a carriage 487 movable vertically in a channel 489 (Figs. 31, 33, 34) formed in the frame 484. The carriage is provided with guide rollers 490 running on tracks 491 within the channel. A link 493 pivoted to the upper end of the carriage connects the carriage with a lever 494 keyed to a rock shaft 495 which is journalled in the side frames 446 and by which the carriage is operated.

The rock shaft 495 is oscillated by a rotating counterdrive shaft 496 through mechanism including a crank arm 498 keyed to the end of the shaft 496 within a bearing frame 499 bolted to one of the side frames 446 and by which the end of the shaft is supported. An arcuately shaped rock arm 500, comprising spaced side plates 501 and end plate 502, is fixed to the rock shaft 495 and carries a connector frame 503. A connecting rod 505 pivoted at one end to the crank 498 extends through a pivot block 506 carried by the frame 503. A coil spring 507 disposed between the pivot block and crank provides a yielding connection for the upward stroke of the crank. Should a jam occur during an assembly stroke of the pusher plate which would prevent a full downward stroke thereof, the yielding nature of the spring connection prevents breakage of the mechanism.

The assembly pusher plates 486 are lowered at each stroke to the same point to completely insert the slotted transverse strips 51 in the slots 139 of the strips 50. When strips having less height are to be assembled, the upper conveyor 468 is lowered into contact with the strips and the stroke of the plate is correspondingly shortened. This is accomplished by adjusting means including pinions 509 on a shaft 510 carried by the connector frame 503 and meshing with rack teeth 511 formed on the upper edges of the plates 501. When a hand wheel 512 on the shaft is rotated, the frame 503 is moved along the arcuate arm 500, thereby moving the pivot point of the connecting rod toward or away from the rock shaft 495. Thus it will be apparent that as the frame is moved outwardly on the arm 500, the upward stroke of the pusher plate carriage is shortened. Clamping bolts 513 lock the frame against movement after adjustment has been made. The lower limit of movement of the pusher plate remains constant and is not affected by the adjustments just described. This is because the plate 501, as shown in Fig. 33, is concentric with the shaft 496 when the pusher plate is in its lowermost position.

The feed conveyors 457 and 468 are driven by means of worm gears 515 and 516 (Figs. 33 and 36 to 38) mounted on the conveyor rolls 469 and 478 respectively and meshing with right and left hand worms 517 carried on a vertically disposed shaft 518. The shaft, which is square in cross-section, and extends through an opening in the upper conveyor frame, is mounted in bearings 519 on one of the side frames 446. Bevel gearing 520 connects the upper end of the shaft 518 with a cross-shaft 521 supported by one of the side frame braces 447. A sprocket 523 mounted on the shaft is driven by a chain 524 trained over a similar sprocket 525 on the drive shaft 496.

Power for driving the assembly mechanism (Figs. 1, 3 and 34) is supplied from the main drive shaft 60 through bevel gearing 528 supported within a casing 529 bolted to the base 52. A telescoping splined shaft 530 extends upwardly from the casing and drives a horizontally disposed clutch shaft 531 (Fig. 34) through gearing 532 supported in a gear case 533 carried by the side frame 446. A clutch 535, mounted in a bearing bracket 536 on the side frame, is adapted to provide a driving connection between the shaft 531 and a shaft 537 which is connected through gearing 538, in a case 539, with the counter-shaft 496. Clutch operating linkage 540 is adapted to disconnect the drive from the assembly mechanism when desired.

Figs. 1 and 35 to 38 illustrate adjusting means for the delivery plate 464. In order to insure the removal of one partition strip at a time by the pusher plates 486, the delivery plate 464 is adapted to be moved toward or away from the assembly point E. The space required may be determined upon operation of the machine according to the thickness of the strips of material being used. Both ends of the plate are provided with mechanism which includes a depending ear 543 having a slot 544 formed therein to receive the end 545 of the conveyor roll shaft and by which the lateral movement of the plate is limited. A rack 546 bolted to the ear is slidably supported between a boss 547 formed on the side frame 446 and a bearing strip 548 bolted to the frame. The rack meshes with a gear 550 on a shaft 551 which extends across the machine and is journaled in the side frames. An actuating handle 553 on one end of the shaft is provided with a detent 554 engaging holes 555 in a fixed plate 556 to retain the selected setting of the delivery plate. A graduated scale 558 indicates the width of the space between the delivery plate and the carrier frame.

Stock guides 552 (Figs. 3, 5 and 34) maintain alignment of the strips 51 while supported on the conveyor 457. These guides are in the form of horizontal bars extending lengthwise of the conveyor and adapted to be removably secured to the lower frame braces 447 between the strips 466. Each guide is provided with a longitudinal rib or flange on its upper face adapted to engage within downwardly facing slots 139 of the strips 51 and maintain the strips in alignment.

Latching means for the hinged carrier frame 484 (see Figs. 34, 35) comprises a rod 560 carried by the frame and provided at each end with a latch handle 561. Notches 562 in the handles engage pins 563 carried by brackets 564 which are bolted to the side frames 446.

A horizontal discharging conveyor 566 (Fig. 6) for receiving the assembled partitions and discharging them from the machine, is disposed partially within the base 52 and in substantial alignment with the top thereof. The conveyor comprises a pair of rolls 567 over which a relatively wide belt of webbing 568 is trained. The rolls are supported in bearings 570 secured to the side walls of the base. Driving connections for the conveyor include bevel gearing 571 and 572 carried on shafting 573 and 574 supported within the base 52 by bearings 575. A gear 577 on the shaft 574 is driven from the speed reduction gearing 59. As the completely assembled partitions are ejected from the guides, they are picked up by the conveyor 566 and removed from the machine for packing or storing.

Modifications may be resorted to within the spirit and scope of our invention.

We claim:

1. A partition assembling machine, comprising in combination mechanism for feeding strips singly and in succession from a magazine, means for arranging said strips in spaced parallel relation, means for advancing a group of the spaced strips as a unit and while held in said spaced parallel relation, to an assembly zone, means for advancing the group of strips step by step within said zone, and mechanism for assembling cross-strips with the strips of said group, said assembling mechanism including means for moving a cross-strip into assembled relation with said group after each said step movement of the group.

2. A partition assembling machine, comprising in combination an endless conveyor comprising a straight stretch arranged to travel in a straight path, strip holding fingers carried thereby and extending outwardly from the conveyor substantially perpendicular to the direction of movement of the conveyor, means for driving the conveyor intermittently step by step and thereby bringing the fingers in succession to a strip receiving position, means for automatically supplying a strip to each finger while at said receiving position, said fingers comprising means for gripping the strips and holding them in parallel spaced relation while in said straight stretch, means for removing the strips in groups from the conveyor, and means for thereafter assembling cross-strips with said groups.

3. A partition assembling machine, comprising in combination an endless conveyor mounted to travel in an endless path coincident with the conveyor and including a straight stretch, strip holding fingers carried by and extending outwardly from the conveyor substantially perpendicular to the direction of movement of the conveyor, means for driving the conveyor, a magazine for holding a pack of strips, feeder mechanism including a reciprocating pusher plate operable to transfer strips from the magazine to said fingers, the latter comprising means for gripping the strips and holding them in parallel spaced relation while in said straight stretch, means for removing the strips in groups from the conveyor, and means for thereafter assembling cross-strips with said groups.

4. A machine for assembling partitions, comprising an endless chain conveyor, sprocket wheels over which the conveyor chain is trained, strip holding fingers carried by said conveyor and arranged side by side and extending outward from the conveyor substantially perpendicular to their direction of movement with the conveyor, each said finger comprising a pair of spaced resilient holding members, means for driving the conveyor step by step and thereby bringing the fingers in succession to a strip receiving position, automatic means for feeding strips to said fingers at said receiving position, said strips being arranged in parallel spaced relation by said conveyor fingers, automatic means for removing the strips in groups from said fingers, and means for assembling cross-strips with the strips of said groups.

5. A machine for assembling partitions comprising an endless chain conveyor, sprocket wheels over which the conveyor chain is trained, strip holding fingers carried by said conveyor and arranged side by side and extending outward from the conveyor substantially perpendicular to their direction of movement with the conveyor, each said finger comprising a pair of spaced resilient holding members, means for driving the conveyor step by step and thereby bringing the fingers in succession to a strip receiving position, automatic means for feeding strips to said fingers at said receiving position, and means for removing the strips in groups from said fingers by a movement in a direction lengthwise of the strips and transverse to the direction of movement of the fingers with the conveyor.

6. A machine for assembling partitions, comprising in combination an endless conveyor, strip holding fingers connected to the conveyor, means for driving the conveyor, means for feeding strips to said fingers, said fingers comprising means for holding the strips edgewise and extending crosswise of the conveyor and projecting outwardly from the conveyor with the strips supported in parallel spaced relation, means for removing the strips in groups from the fingers, means for supporting the strips in their spaced parallel relation while being removed from the fingers, and means for assembling cross-strips with the strips of said groups.

7. A machine for assembling partitions, comprising in combination an endless conveyor, strip holding fingers connected to the conveyor, means for driving the conveyor, means for feeding strips to said fingers, said fingers comprising means for holding the strips edgewise and extending crosswise of the conveyor and projecting outwardly from the conveyor with the strips supported in parallel spaced relation, mechanism for removing the strips in groups from the conveyor fingers, comprising a head, means for reciprocating the head in a direction transverse to the conveyor, and means carried by said head for engaging the strips and withdrawing them in a group from the conveyor fingers.

8. A machine for assembling partitions, comprising in combination an endless conveyor, strip holding fingers connected to the conveyor, means for driving the conveyor, means for feeding strips to said fingers, said fingers comprising means for holding the strips edgewise and extending crosswise of the conveyor and projecting outwardly from the conveyor with the strips supported in parallel spaced relation, mechanism for removing the strips in groups from the conveyor fingers, comprising a head, pusher fingers carried by said head and spaced to correspond with the spacing of said holding fingers, and means for reciprocating said head in a direction parallel with the strips and causing the pusher fingers to engage said strips and remove them lengthwise from the holding fingers.

9. A machine for assembling partitions, comprising a conveyor, strip holding fingers carried by the conveyor, means for driving the conveyor intermittently step by step and thereby bringing the fingers in succession to a strip receiving position, means for feeding strips to said fingers, mechanism for transferring the strips from said fingers, said mechanism including strip engaging means, mechanism for reciprocating said strip engaging means in a direction transverse to the conveyor and thereby removing the strips from the conveyor fingers, and means for advancing said strip engaging means step by step in the direction of movement of the conveyor and in synchronism with the step movements of the conveyor during the removal of the strips from said fingers.

10. A machine for assembling partitions, comprising an endless conveyor, slotted fingers carried by the conveyor for receiving partition strips, means for feeding strips to the fingers, the slots of said fingers extending transversely to the direction of movement of the conveyor, said fingers arranged to hold the strips edgewise in parallel spaced relation, mechanism for removing the strips in groups from the fingers including a transfer head, pusher fingers carried by said head, means for reciprocating said head transversely of the conveyor and causing the pusher fingers to engage the strips and pass through said slots, thereby removing the strips in a group from the slots, and means for causing a step by step movement of the transfer head in the direction of movement of the conveyor and in synchronism with the conveyor movements during said transfer.

11. A partition assembling machine, comprising in combination an endless conveyor, strip holding fingers carried thereby and projecting outwardly therefrom, means for feeding strips to said fingers, means for driving the conveyor, tracks extending from said conveyor, means for transferring strips from the conveyor to said tracks in groups, means for advancing the strips along the tracks to an assembling position, and means for assembling cross-strips with said groups of strips for completing the partitions.

12. A partition assembling machine, comprising in combination an endless conveyor, strip holding fingers carried thereby and projecting outwardly therefrom, means for feeding strips to said fingers, means for driving the conveyor, tracks extending from said conveyor, means for transferring strips from the conveyor to said tracks in groups, means for advancing the strips along the tracks to an assembling position, said tracks being arranged in groups and fanned outwardly in a manner to divide a group of strips into a plurality of sub-groups, and means for assembling cross-strips with the sub-groups.

13. A partition assembling machine, comprising in combination an endless conveyor, strip holding fingers carried thereby and projecting outwardly therefrom, means for feeding strips to said fingers, means for driving the conveyor, tracks extending from said conveyor, means for transferring strips from the conveyor to said tracks in groups, means for advancing the strips along the tracks to an assembling position, said tracks being arranged in groups and fanned outwardly in a manner to divide a group of strips into a plurality of sub-groups, and automatic means for simultaneously moving cross-strips into assembled relation with the said groups of strips and thereby concomitantly assembling a plurality of partitions.

14. A machine for assembling partitions, comprising in combination an endless conveyor, strip holding fingers carried thereby, means for supplying strips to said fingers, mechanism for driving the conveyor step by step, transfer mechanism operable to remove the strips in groups from said conveyor fingers, said transfer mechanism including a transfer head, means for reciprocating said head transversely of the conveyor, means carried by said head for engaging a group of strips and sliding them off said fingers, interconnected driving mechanism between said transfer head and the conveyor for moving said head intermittently step by step with the conveyor and in the direction of travel of the conveyor during said removal of strips from the fingers, means for disconnecting said head from the conveyor driving mechanism, and an air motor operable to return said head to position for a succeeding step by step movement with the conveyor.

15. A partition assembling machine, comprising a conveyor, strip holding fingers carried thereby, means for supplying strips to said fingers, means for driving the conveyor, tracks extending from the conveyor in a direction substantially perpendicular to the direction of movement of the conveyor, means for transferring strips from the conveyor to the tracks, means for causing the end portions of the tracks adjacent the conveyor to advance therewith during the transfer of the strips to the tracks, means for moving the strips along the tracks to an assembly position, and means for assembling cross-strips therewith.

16. A partition assembling machine, comprising a conveyor, strip holding fingers carried thereby, means for supplying strips to said fingers, means for driving the conveyor, tracks extending from the conveyor in a direction substantially perpendicular to the direction of movement of the conveyor, means for transferring strips from the conveyor to the tracks, means for causing the end portions of the tracks adjacent the conveyor to advance therewith during the transfer of the strips to the tracks, means for moving the strips along the tracks to an assembly position, means for assembling cross-strips therewith, and means for holding the opposite end portions of the tracks stationary, said tracks comprising overlapping sections relatively movable lengthwise to permit variations in the effective length of the tracks caused by said movements of end portions thereof with the conveyor.

17. A partition assembling machine, comprising a track, a conveyor extending in a direction perpendicular to the track and traveling in said direction, means for transferring partition strips in succession from the conveyor to the track at one end thereof with the strips supported on edge in the track, means for advancing the strips step by step along the track to an assembly position, and means for assembling cross-strips with said strips on the track.

18. A partition assembling machine, comprising a track, means for delivering partition strips in succession to the track at one end thereof with the strips supported on edge in the track, pusher bars arranged at different points of advancement along the track, means for reciprocating the pusher bars lengthwise of the track and causing each pusher bar during each forward movement to advance a strip a predetermined distance along the track whereby each strip is engaged by said pusher bars in succession and is moved by the foremost pusher bar to an assembly zone, means for advancing the strip with comparatively short step movements through said zone, and means for assembling cross-strips therewith in alternation with said step movements.

19. A partition assembling machine, comprising in combination a plurality of horizontally disposed tracks, means for delivering strips to said tracks, means for advancing them along the tracks while held supported on edge on the tracks, said strip advancing means comprising pusher bars arranged at different points of advancement along the tracks, means for moving said bars in a substantially rectangular path, including a forward horizontal movement for advancing the strips, an upward movement to clear the strips, a return horizontal movement and a downward movement to the starting position preparatory to moving the strips forward another step, said tracks being fanned outwardly and forwardly with their forward portions arranged in groups and thereby segregating the strips into groups, and means for assembling cross-strips with said groups.

20. A partition assembling machine, comprising in combination a plurality of horizontally disposed tracks, means for delivering strips to said tracks, means for advancing them along the tracks while held supported on edge on the tracks, said strip advancing means comprising pusher bars arranged at different points of advancement along the tracks, means for moving said bars in a substantially rectangular path, including a forward horizontal movement for advancing the strips, an upward movement to clear the strips, a return horizontal movement and a downward movement to the starting position preparatory to moving the strips forward another step, said tracks being fanned outwardly and forwardly with their forward portions arranged in groups and thereby segregating the strips into groups, means for imparting comparatively short step by step forward movements to said goups after they have passed beyond the range of said pusher bars, and means for assembling a cross-strip with each said group after each said short forward movement.

21. A partition assembling machine, comprising a series of horizontally disposed tracks arranged side by side, means for arranging partition strips in groups, means to transfer said groups to said tracks with the strips arranged on edge, pusher bars arranged at different positions of advancement along the tracks, automatic means for reciprocating the pusher bars as a unit lengthwise of the tracks and causing each pusher bar during its forward movement to advance a group of strips one step along the track, whereby the groups are advanced step by step by the pusher bars in succession, and strip assembling mechanism comprising means for imparting short step by step movements to the groups and means for assembling cross-strips with the groups singly and in succession in alternation with said short step by step movements.

22. A partition assembling machine, comprising in combination tracks arranged side by side and extending lengthwise of the machine, means for delivering strips to said tracks, pusher bars arranged at different positions of advancement along the tracks, guide rails, means providing a sliding connection between the pusher bars and the guide rails, means for reciprocating the pusher bars lengthwise of the tracks, and means for lifting and lowering the guide rails and thereby lifting and lowering the pusher bars.

23. A partition assembling machine, comprising in combination tracks arranged side by side and extending lengthwise of the machine, means for delivering strips to said tracks, pusher bars arranged at different positions of advancement along the tracks, guide rails, means providing a sliding connection between the pusher bars and the guide rails, means for reciprocating the pusher bars lengthwise of the tracks, means for lifting and lowering the guide rails and thereby lifting and lowering the pusher bars, the foremost of said pusher bars being arranged to advance each group of strips to an assembly line, means to feed cross-strips downward at said assembly line into assembled relation to the said groups of strips, and means for moving the groups of strips across the assembly line by short, intermittent step movements, said step movements being in alternation with the said movements of the cross-strips.

24. A partition assembling machine, comprising automatic means for feeding strips singly and in succession from a stack of said strips, means for arranging the strips in groups with the strips in parallel spaced relation and supported on edge, means for advancing the groups in succession to an assembling position, assembling mechanism operable to advance each group step by step across an assembly line, and means operable in alternation with said step movements to move cross-strips downward at the assembly line into assembled relation to the group of strips, the means for advancing the groups to the assembling position being operable to cause each group as it is brought to assembling position to engage and eject the next preceding assembled partition.

25. A machine for assembling partitions, including means for arranging a group of longitudinal strips in parallel spaced relation with the strips supported on longitudinal edges, said strips being provided with vertical slots at intervals along their length, fingers individual to the strips of the group, means for reciprocating said fingers as a unit in a direction lengthwise of the strips, means for moving each finger into a said slot and holding it in the slot during the forward movement of the fingers and for releasing the fingers from the slots at the end of said forward movement, whereby the group of strips is advanced step by step, and means alternating with said step movements of the group to move cross-strips into assembled relation with said group with the cross-strips entering said slots.

26. A partition assembling machine, comprising means for advancing a group of slotted parallel spaced strips step by step through an assembling zone, said means comprising a series of upright rods individual to the strips, finger pieces carried by said rods, means for oscillating said rods and moving the finger pieces into and out of engagement with the strips at the slots therein, means for moving the rods forward as a unit after each said engagement of the finger pieces with the strips a distance corresponding to the spacing of said slots, and then returning said rods while disengaged from the strips, whereby the group of strips is advanced step by step, and means for assembling cross-strips with the said group, including means for moving a cross-strip into assembled relation with the group after each step movement of the group of strips.

27. A partition assembling machine, comprising means for advancing a group of slotted parallel spaced strips step by step through an assembling zone, said means comprising a series of upright rods individual to the strips, finger pieces carried by said rods, a cam shaft, cams thereon individual to said rods, means actuated by the cams for oscillating the rods, means for oscillating the cam shaft and causing the cams to oscillate said rods, thereby moving the finger pieces into and out of driving connection with the strips, and means for reciprocating said rods lengthwise of the strips and thereby causing said finger pieces to advance the strips step by step.

28. A machine for assembling partitions, comprising a vertically disposed assembly pusher plate, a horizontal rock shaft, a rock arm thereon, a link connecting the rock arm with the pusher plate, means for rocking said shaft and thereby reciprocating the pusher plate up and down, means for feeding a pack of strips across the path of the pusher plate, an arc-shaped arm connected to said rock shaft, a crank shaft, a crank thereon, a connecting rod connected at its ends respectively to said crank and to said arc-shaped arm, and means for adjusting the point of connection of said connecting rod with the arm and thereby adjustably varying the length of stroke of said pusher plate, said arc-shaped arm being concentric with the crank shaft when the pusher bar is in its lowermost position, whereby the length of stroke of the pusher bar may be adjusted while its lowermost position remains constant.

29. A partition assembling machine, comprising a magazine for holding a stack of strips with the individual strips in horizontal position, feeder mechanism for feeding the strips in succession from the pack, means for uprighting the strips in succession and arranging them in spaced parallel relation, means for segregating the uprighted strips into groups, and means for assembling cross-strips with said groups to form partitions.

30. A partition assembling machine, comprising a magazine for holding a stack of strips with the individual strips in horizontal position, feeder mechanism for feeding the strips in succession from the pack, means for uprighting the strips in succession and arranging them in spaced parallel relation, means for segregating the uprighted strips into groups, means for advancing said groups in the direction of their length, means for dividing each said group into subgroups as the strips advance, means for supporting packs of cross-strips with the individual cross-strips in vertical planes, and means for feeding the cross-strips downward from said packs into assembled relation with the strips of said groups and thereby forming assembled partitions.

31. A machine for assembling partitions consisting of longitudinal strips and cross-strips, said machine comprising mechanism for grouping and arranging longitudinal strips, said mechanism including a carrier, means for feeding longitudinal strips singly and in succession to the carrier, and means for actuating the carrier and causing it to position the strips in spaced parallel relation, and means operable thereafter to assemble cross-strips with said longitudinal strips while the latter are held in said spaced parallel relation.

32. A partition assembling machine comprising a magazine to support a pack of strips, a conveyor, strip holding fingers carried by and extending transversely of said conveyor, feeding mechanism operable to feed longitudinal strips singly and in succession from the magazine into position to be engaged and held by said fingers, means for driving the conveyor and causing it to advance step by step and thereby bringing the fingers into position to receive said strips and causing said fingers, after receiving the strips, to arrange them in parallel spaced relation with the strips extending transversely of the direction of movement with the conveyor, and means for assembling cross-strips singly and in succession with said longitudinal strips.

PAUL C. B. ALLEN.
JULIUS E. WILSKE.
FRANCIS A. McCORMICK.
ALBERT S. JACKSON.